US008541751B2

(12) United States Patent
Nishino et al.

(10) Patent No.: US 8,541,751 B2
(45) Date of Patent: Sep. 24, 2013

(54) METHOD OF MANAGING RADIATION DETECTORS, RADIOGRAPHIC IMAGE CAPTURING APPARATUS, AND RADIOGRAPHIC IMAGE CAPTURING SYSTEM

(75) Inventors: Naoyuki Nishino, Kanagawa-ken (JP); Yasunori Ohta, Kanagawa-ken (JP); Haruyasu Nakatsugawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 13/064,373

(22) Filed: Mar. 22, 2011

(65) Prior Publication Data
US 2011/0233411 A1    Sep. 29, 2011

(30) Foreign Application Priority Data

Mar. 26, 2010  (JP) ................................. 2010-073737
Dec. 14, 2010  (JP) ................................. 2010-277774

(51) Int. Cl.
*G01T 1/20*          (2006.01)
(52) U.S. Cl.
USPC ................................................... 250/370.11
(58) Field of Classification Search
USPC ................................................... 250/370.11
See application file for complete search history.

(56) References Cited

U.S. PATENT DOCUMENTS

| 4,524,390 | A  | * | 6/1985 | Lemke ........................... 348/247 |
| 7,768,002 | B2 |   | 8/2010 | Kitamura et al. |
| 7,847,258 | B2 |   | 12/2010 | Yaegashi et al. |
| 2003/0169847 | A1 | * | 9/2003 | Karellas et al. ............... 378/98.3 |
| 2008/0245968 | A1 | * | 10/2008 | Tredwell et al. ......... 250/370.09 |
| 2009/0021607 | A1 | * | 1/2009 | Takenaka et al. ........ 348/231.99 |

FOREIGN PATENT DOCUMENTS

| JP | 2000-284059 | 10/2000 |
| JP | 2001-145617 | 5/2001 |
| JP | 2009-32854 | 2/2009 |
| JP | 2009-212389 | 9/2009 |

* cited by examiner

*Primary Examiner* — David Porta
*Assistant Examiner* — Hugh H Maupin
(74) *Attorney, Agent, or Firm* — Jean C. Edwards, Esq.; Edwards Neils PLLC

(57) ABSTRACT

A method of managing radiation detectors allows the radiation detectors to be assembled into a radiographic image capturing apparatus such that defective pixels of the radiation detectors are not disposed at the same pixel position (coordinates). The method comprises the steps of recognizing the positions of defective pixels of a plurality of manufactured radiation detectors, referring to the recognized positions of the defective pixels, and assembling at least two radiation detectors into the radiographic image capturing apparatus in a superposed relationship, such that the defective pixels of the radiation detectors are not superposed one on the other.

9 Claims, 30 Drawing Sheets

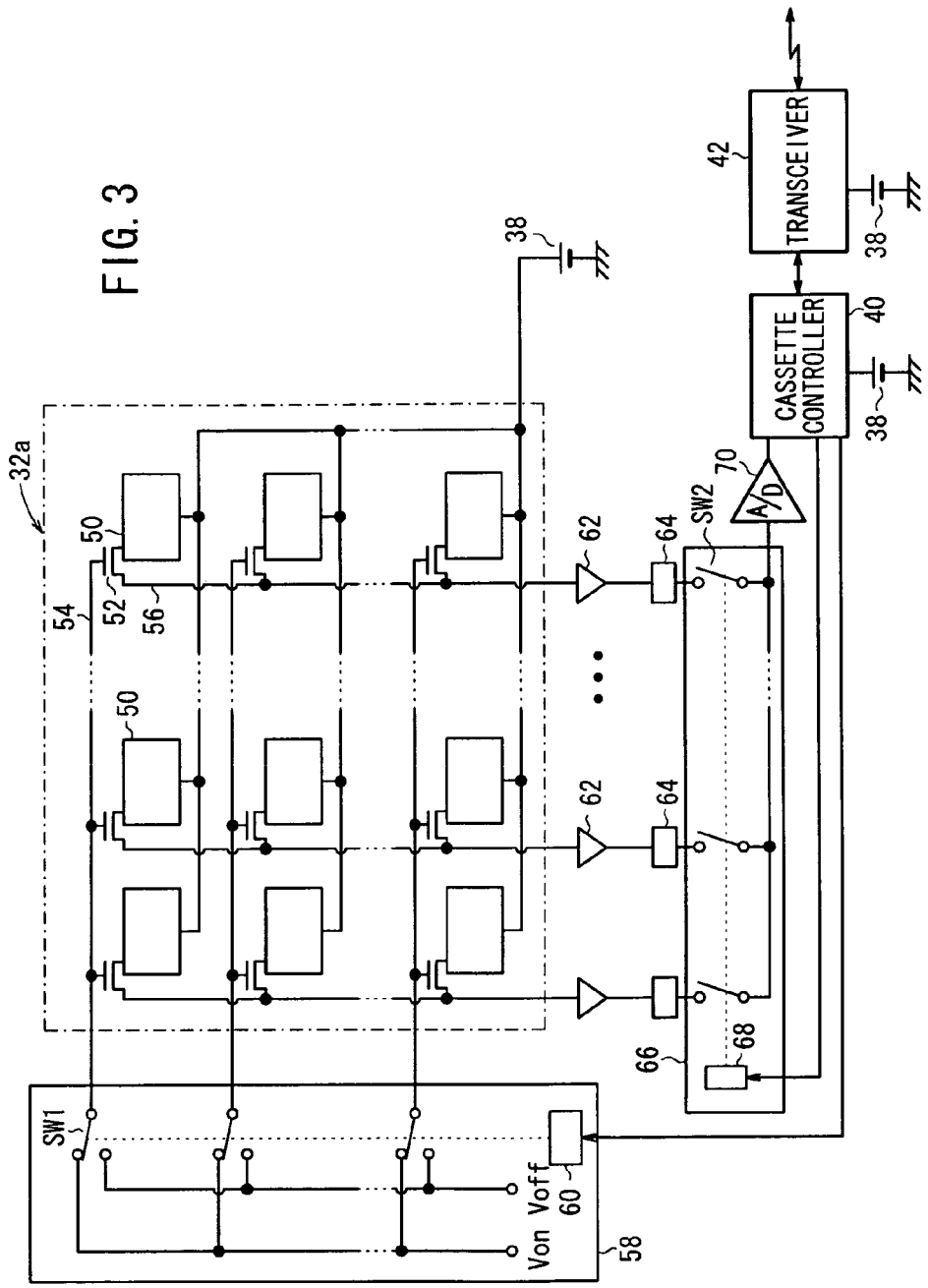

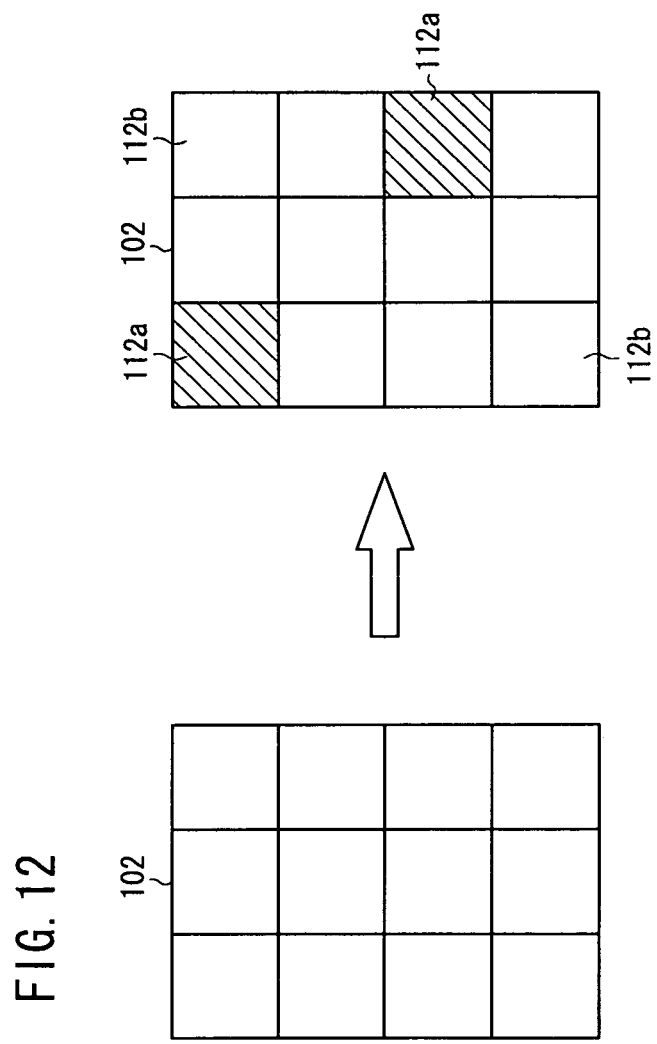

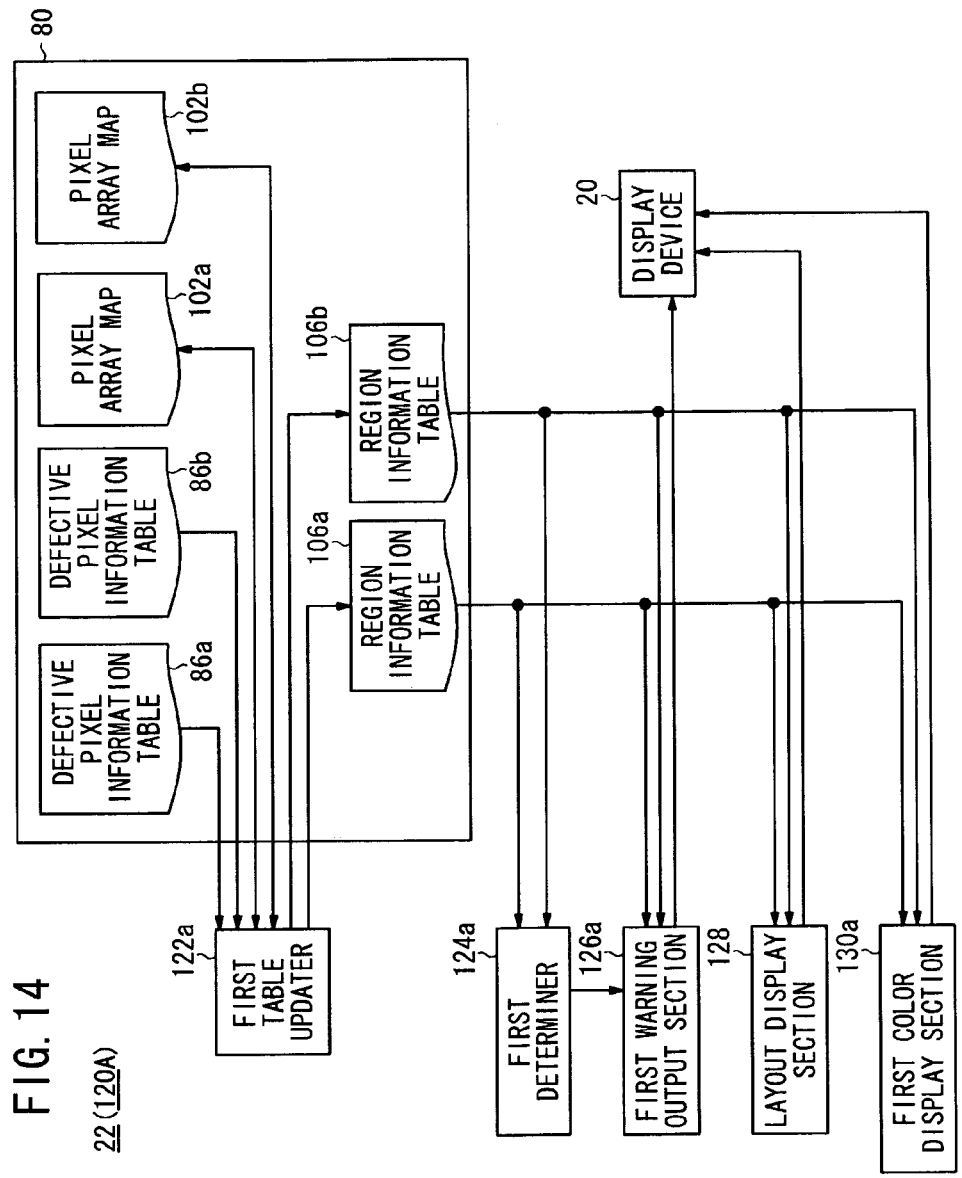

FIRST RELATIONSHIP: FIRST REGIONS ARE SUPERPOSED ONE ON OTHER

TO DISPLAY DEVICE

THIRD RELATIONSHIP: DEFECTIVE PIXEL OF ONE OF RADIATION DETECTORS IS INCLUDED IN DEFECTIVE PIXEL AND PERIPHERAL PIXELS THEREAROUND OF OTHER RADIATION DETECTOR

METHOD OF MANAGING RADIATION DETECTORS, RADIOGRAPHIC IMAGE CAPTURING APPARATUS, AND RADIOGRAPHIC IMAGE CAPTURING SYSTEM

CROSS-REFERENCE TO RELATED APPLICATION

This application is based upon and claims the benefit of priority from Japanese Patent Applications No. 2010-073737 filed on Mar. 26, 2010 and No. 2010-277774 filed on Dec. 14, 2010, of which the contents are incorporated herein by reference.

BACKGROUND OF THE INVENTION

1. Field of the Invention

The present invention relates to a method of managing a plurality of radiation detectors, which are stacked together during use, a radiographic image capturing apparatus including a plurality of stacked radiation detectors, and a radiographic image capturing system that manages such a radiographic image capturing apparatus.

2. Description of the Related Art

In the medical field, there have widely been used radiographic image capturing apparatus, which apply radiation to a subject and guide the radiation that has passed through the subject to a radiation detector, which captures a radiographic image from the radiation. Known forms of radiation detectors include a conventional radiation film for recording a radiographic image by way of exposure, and a stimulable phosphor panel for storing radiation energy representing a radiation image in a phosphor, and reproducing the radiographic image as stimulated light by applying stimulating light to the phosphor. The radiation film with a radiographic image recorded therein is supplied to a developing device to develop the radiographic image, or the stimulable phosphor panel is supplied to a reading device to read the radiographic image as a visible image.

In an operating room or the like, it is necessary to read a recorded radiographic image immediately from a radiation detector after the radiographic image has been captured, for the purpose of quickly and appropriately treating patients. To meet such a requirement, there has been developed a radiation detector having a solid-state detector for converting radiation directly into electric signals, or converting radiation into visible light with a scintillator, and then converting the visible light into electric signals in order to read a detected radiographic image.

There is known a method of correcting data from a defective pixel of a radiation detector with data from pixels in the vicinity of the defective pixel in a radiographic image capturing apparatus, which incorporates such a radiation detector therein (see Japanese Laid-Open Patent Publication No. 2000-284059 and Japanese Laid-Open Patent Publication No. 2001-145617).

Specifically, Japanese Laid-Open Patent Publication No. 2000-284059 discloses the correction of data from a defective pixel in a radiographic image capturing apparatus, which incorporates a single radiation detector therein. Japanese Laid-Open Patent Publication No. 2001-145617 discloses the correction of data from a defective pixel in a radiographic image capturing apparatus, which incorporates two radiation detectors therein.

Japanese Laid-Open Patent Publication No. 2001-145617 states that when an X-ray detecting element of a front planar X-ray detector 51 (or a rear planar X-ray detector 52) becomes defective and causes an output error, a flaw correction processor 25 multiplies an output signal from an X-ray detecting element, in the same pixel position as the defective X-ray detecting element, of the rear planar X-ray detector 52 (or the front planar X-ray detector 51) by a coefficient in order to estimate an output signal from the defective X-ray detecting element, so as to perform flaw correction. Since the disclosed process uses the output signal of the defect-free X-ray detecting element in the same pixel position as the defective X-ray detecting element, it is considered to be more advantageous than the process disclosed in Japanese Laid-Open Patent Publication No. 2000-284059.

Radiation detectors should ideally be free of defective pixels. However, practically, it is highly difficult and hence costly to manufacture radiation detectors that are completely free of defective pixels. Expensive radiation detectors make it impossible to construct inexpensive mass-produced radiographic image capturing systems. One approach is to allow the radiation detectors to have certain defective pixels and correct output signals from such defective pixels. However, the process disclosed in Japanese Laid-Open Patent Publication No. 2001-145617 is problematic in that such a process cannot correct output signals from defective pixels if the defective pixels are in the same pixel position (coordinates) in the two radiation detectors.

There has been a demand for construction of a radiographic image capturing system, which allows defective pixels to initially be present to the extent that output signals therefrom can be corrected, i.e., a radiographic image capturing system that allows defective pixels to remain to a certain extent.

SUMMARY OF THE INVENTION

It is an object of the present invention to provide a method of managing two or more radiation detectors to allow defective pixels to initially be present to a certain extent, thereby enabling an inexpensive mass-produced radiographic image capturing system, a radiographic image capturing apparatus including two or more radiation detectors managed by such a method, and a radiographic image capturing system, which incorporates therein such a radiographic image capturing apparatus.

According to a first aspect of the present invention, there is provided a method of managing at least two radiation detectors of a radiographic image capturing apparatus, comprising the steps of recognizing positions of defective pixels of a plurality of manufactured radiation detectors, referring to recognized positions of defective pixels, and assembling at least two radiation detectors in a superposed relationship into the radiographic image capturing apparatus, such that the defective pixels of the radiation detectors are not superposed one on the other.

In the first aspect of the present invention, the radiation detectors are assembled in a superposed relationship in the radiographic image capturing apparatus, such that the defective pixels of the radiation detectors are not superposed one on the other in one pixel position.

In the first aspect of the present invention, the method further comprises the step of selecting two radiation detectors to be assembled in the radiographic image capturing apparatus, from among the manufactured radiation detectors, wherein the step of selecting two radiation detectors comprises the step of selecting two radiation detectors, so as to include no defective pixels superposed in the same pixel position, by referring to the recognized positions of defective pixels.

In the first aspect of the present invention, the method further comprises the step of generating a plurality of region information tables corresponding to the respective manufactured radiation detectors, each registering therein positional information of first regions including defective pixels and second regions free of defective pixels, wherein the first regions and the second regions have the same pixel array, and the step of selecting two radiation detectors comprises the step of selecting two radiation detectors, so that the first regions and the second regions are superposed one on the other when the two radiation detectors are stacked together, from among the manufactured radiation detectors, based on the region information tables.

In the first aspect of the present invention, the method further comprises the steps of reflecting the position of a defective pixel, which is newly discovered in a regular or irregular defective pixel detecting process carried out on the radiographic image capturing apparatus, which incorporates the two radiation detectors stacked together, in the region information tables corresponding to the two radiation detectors, determining whether or not the first regions are superposed one on the other based on the region information tables corresponding to the two radiation detectors stacked together, and issuing a warning if it is judged in the step of determining that the first regions are superposed one on the other.

In the first aspect of the present invention, the method further comprises the step of generating a plurality of corrective region information tables corresponding to the respective manufactured radiation detectors, each registering therein positional information of a corrective unit region, wherein the corrective unit region represents a region including a defective pixel and peripheral pixels used in correcting data of the defective pixel. Further, the step of selecting two radiation detectors comprises the step of selecting two radiation detectors from among the manufactured radiation detectors, so that corrective unit regions thereof are not even partially superposed one on the other when two radiation detectors are stacked together, based on the corrective region information tables.

In the first aspect of the present invention, the method further comprises the steps of reflecting the position of a defective pixel, which is newly discovered in a regular or irregular defective pixel detecting process carried out on the radiographic image capturing apparatus, which incorporates the two radiation detectors stacked together, in the corrective region information tables corresponding to the two radiation detectors, determining whether or not the corrective unit regions are even partially superposed one on the other based on the corrective region information tables corresponding to the two radiation detectors stacked together, and issuing a warning if it is judged in the step of determining that the corrective unit regions are even partially superposed one on the other.

In the first aspect of the present invention, the method further comprises the step of, when the two radiation detectors are displaced less than one-pixel pitch along at least one direction and are assembled into the radiographic image capturing apparatus, generating a plurality of peripheral pixel information tables corresponding to respective manufactured radiation detectors, each registering therein positional information of a defective pixel and peripheral pixels disposed therearound and adjacent thereto along a row and a column, wherein the step of selecting two radiation detectors comprises the step of selecting two radiation detectors from among the manufactured radiation detectors so that a defective pixel of one of the two radiation detectors is not included in a defective pixel and peripheral pixels therearound of the other of the two radiation detectors, and also so that a defective pixel of the other of the two radiation detectors is not included in a defective pixel and peripheral pixels therearound of the one of the two radiation detectors, when the two radiation detectors are stacked together, based on the peripheral pixel information tables.

In the first aspect of the present invention, the method further comprises the steps of reflecting the position of a defective pixel, which is newly discovered in a regular or irregular defective pixel detecting process carried out on the radiographic image capturing apparatus, which incorporates the two radiation detectors stacked together, in the peripheral pixel information tables corresponding to the two radiation detectors, determining whether or not a defective pixel of the one of the two radiation detectors is included in a defective pixel and peripheral pixels therearound of the other of the two radiation detectors based on the peripheral pixel information tables corresponding to the two radiation detectors stacked together, and issuing a warning if it is judged in the step of determining that a defective pixel of the one of the two radiation detectors is included in a defective pixel and peripheral pixels therearound of the other of the two radiation detectors.

According to a second aspect of the present invention, there is provided a radiographic image capturing apparatus comprising at least two radiation detectors for detecting and converting radiation that has passed through a subject into radiographic image information, wherein the at least two radiation detectors are assembled in place such that defective pixels thereof are not superposed one on the other in the same pixel position.

In the second aspect of the present invention, two of the radiation detectors are provided, designated respectively as a first radiation detector and a second radiation detector, the invention further comprising a scintillator disposed between the first radiation detector and the second radiation detector and which converts the radiation into light, the first radiation detector, which is positioned closer to a side of the subject than the scintillator, including a photoelectric conversion device for absorbing the light and generating electric charges corresponding to the light, and a signal output unit for converting the charges into electric signals and outputting the electric signals. The photoelectric conversion device includes an organic photoconductor, and the signal output unit includes an organic semiconductor material.

In the second aspect of the present invention, two of the radiation detectors are provided, designated respectively as a first radiation detector and a second radiation detector, and the first radiation detector and the second radiation detector have characteristics different from each other.

In the second aspect of the present invention, the characteristic is resolution.

In the second aspect of the present invention, each of the at least two radiation detectors has at least one corrective unit region which is a region including a defective pixel and peripheral pixels used in correcting the defective pixel, and the at least two radiation detectors are assembled in place such that defective pixels of one radiation detector are not superposed on the corrective unit region of another radiation detector.

In the second aspect of the present invention, at least one of the at least two radiation detectors comprises a photoelectric conversion device for absorbing light and generating electrical charges corresponding to the light, and a signal output unit for converting the electrical charges into electric signals and outputting the electric signals, the photoelectric conversion device including an organic photoconductor, the signal output unit including an organic semiconductor material.

In the second aspect of the present invention, a scintillator is interposed between the at least two radiation detectors, and at least one of the at least two radiation detectors is not fixed to the scintillator.

According to a third aspect of the present invention, there also is provided a radiographic image capturing system including a radiographic image capturing apparatus, which incorporates therein two radiation detectors, for detecting and converting radiation that has passed through a subject into radiographic image information, comprising a plurality of region information tables generated corresponding to the respective two radiation detectors, and each registering therein positional information of first regions including defective pixels and second regions free of defective pixels, a first table updater for reflecting the position of a defective pixel, which is newly discovered in a regular or irregular defective pixel detecting process carried out on the radiographic image capturing apparatus, in the region information tables, a first determiner for determining whether or not the first regions are superposed one on the other based on the region information tables, which reflect the position of the newly discovered defective pixel, and a first warning output section for issuing a warning if the first determiner judges that the first regions are superposed one on the other.

In the third through fifth aspects of the present invention, two of the radiation detectors are provided, designated respectively as a first radiation detector and a second radiation detector, the invention further comprising a scintillator disposed between the first radiation detector and the second radiation detector and which converts the radiation into light, the first radiation detector, which is positioned closer to a side of the subject than the scintillator, including a photoelectric conversion device for absorbing light and generating electric charges corresponding to the light, and a signal output unit for converting the charges into electric signals and outputting the electric signals. The photoelectric conversion device includes an organic photoconductor, and the signal output unit includes an organic semiconductor material. The method of managing radiation detectors, the radiographic image capturing apparatus, and the radiographic image capturing system according to the present invention enable defective pixels to initially be present to a certain extent, so that it is possible to construct an inexpensive mass-produced radiographic image capturing system.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a block diagram of a circuit arrangement of a radiation detector according to the embodiment of the present invention;

FIG. 12 is a diagram showing a process of dividing a pixel array map into a plurality of first regions and a plurality of second regions;

FIG. 14 is a block diagram of a first management processor of the console;

DESCRIPTION OF THE PREFERRED EMBODIMENTS

A radiation detector managing method, a radiographic image capturing apparatus, and a radiographic image capturing system according to an embodiment of the present invention will be described below with reference to FIGS. 1 through 30.

Figure 1:
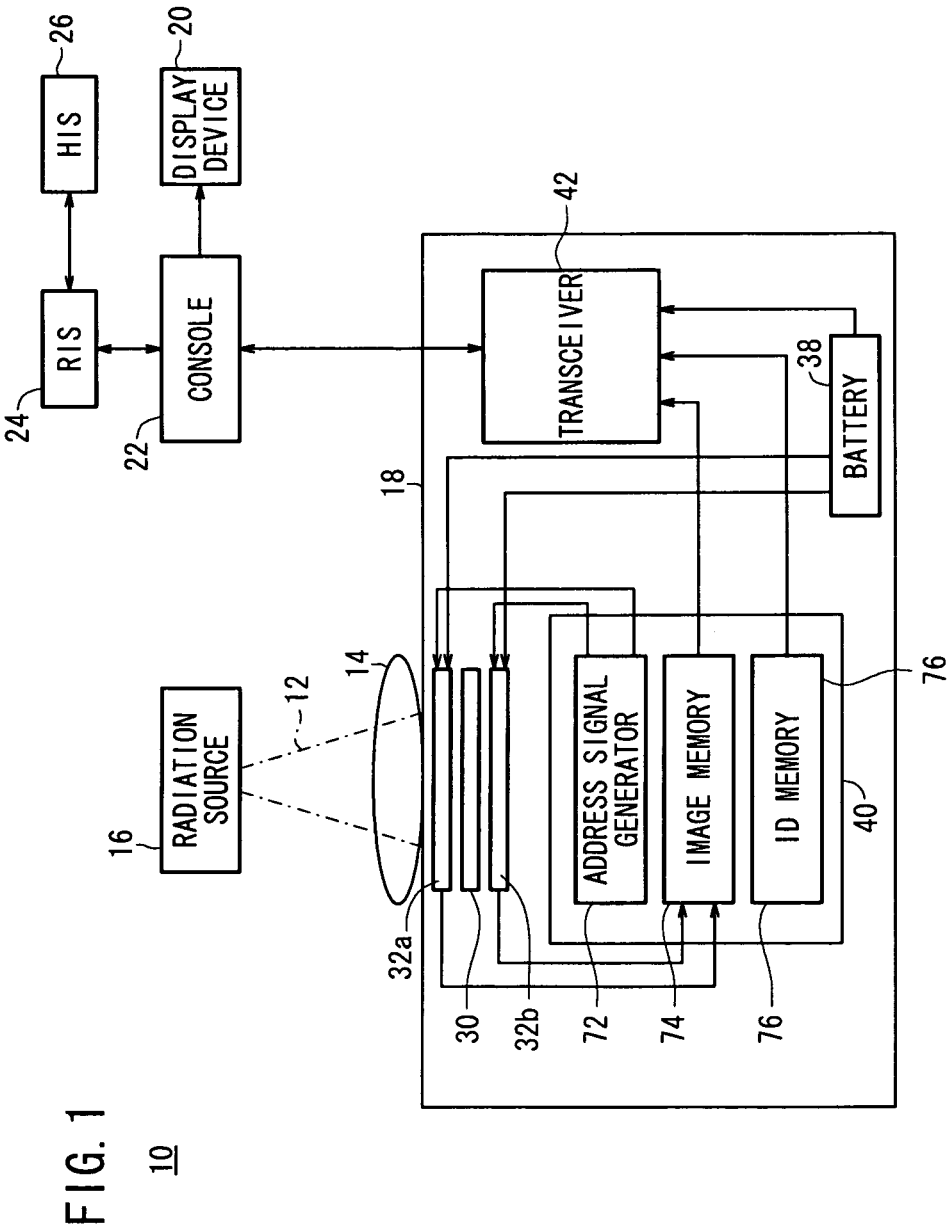
FIG. 1 is a block diagram of a radiographic image capturing system according to an embodiment of the present invention.

As shown in FIG. 1, a radiographic image capturing system 10 according to an embodiment of the present invention comprises a radiation source 16 for applying radiation 12, having a dose according to image capturing conditions, to a subject 14 such as a patient, a radiographic image capturing apparatus (hereinafter referred to as an "electronic cassette") 18 for detecting radiation 12 that has passed through the subject 14, a display device 20 for displaying radiographic image information based on the radiation 12 detected by the electronic cassette 18, and a console 22 for controlling the electronic cassette 18, the radiation source 16, and the display device 20. The console 22, the electronic cassette 18, the radiation source 16, and the display device 20 send and receive signals to and from each other by way of a wireless LAN or wireless communications according to standards such as UWB (Ultra-Wide Band), IEEE802.11.a/g/n, or the like. The console 22 is connected to a radiology information system (RIS) 24, which generally manages radiographic image information handled by the radiological department of a hospital, as well as other information. The RIS 24 is connected to a hospital information system (HIS) 26, which generally manages medical information in the hospital.

Figure 2:
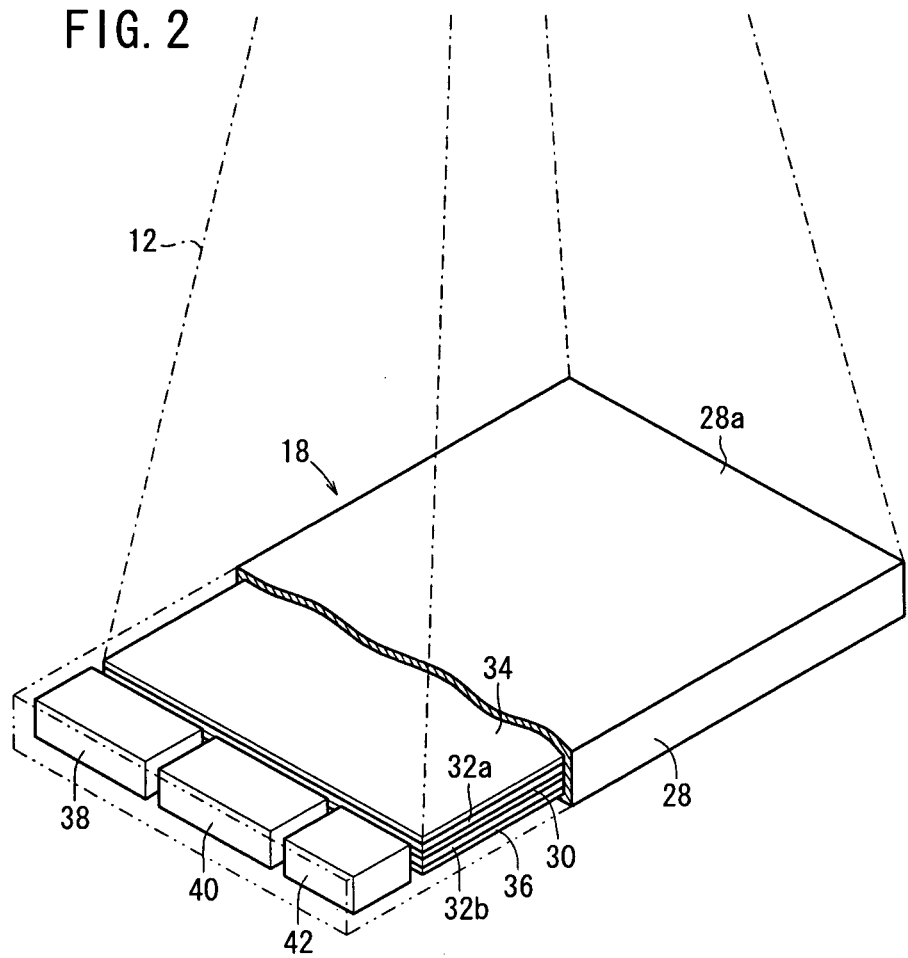
FIG. 2 is a perspective view, partially cut away, showing internal structural details of an electronic cassette (radiographic image capturing apparatus) according to the embodiment of the present invention.

As shown in FIG. 2, the electronic cassette 18 includes a casing 28 made of a material permeable to radiation 12. The casing 28 houses therein a scintillator 30 positioned substantially centrally along the height of the casing 28, a first radiation detector 32a disposed in confronting relation to a surface of the scintillator 30, which is diposed near to an irradiated surface 28a of the casing 28, a grid 34 disposed in confronting relation to a surface of the first radiation detector 32a near the irradiated surface 28a of the casing 28, for removing scattered rays of radiation 12 from the patient 14, a second radiation detector 32b disposed in confronting relation to the other surface of the scintillator 30, and a lead plate 36 disposed in confronting relation to a surface of the second radiation detector 32b remote from the scintillator 30, for absorbing back scattered rays of radiation 12. The irradiated surface 28a of the casing 28 may be constructed as the grid 34. The scintillator 30 is made of a phosphor composed of GOS($Gd_2O_2S$) or CsI(Tl) (cesium iodide to which thallium has been added) for converting radiation 12 that has passed through the subject 14 into visible light.

When the scintillator 30 converts radiation 12 that has passed through the subject 14 into visible light, the scintillator 30 emits visible light depending on the dose of radiation 12 applied thereto from one surface thereof, which faces toward the first radiation detector 32a, and also emits visible light depending on the dose of radiation 12 that has passed therethrough from the other surface thereof, which faces toward the second radiation detector 32b. Therefore, visible light emitted from the one surface of the scintillator 30 is detected by the first radiation detector 32a, whereas visible light emitted from the other surface of the scintillator 30 is detected by the second radiation detector 32b. The intensity of visible light applied to the second radiation detector 32b is lower than the intensity of visible light applied to the first radiation detector 32a.

The casing 28 also houses therein a battery 38 serving as a power supply for the electronic cassette 18, a cassette controller 40 for energizing the first radiation detector 32a and the second radiation detector 32b with electric power supplied from the battery 38, and a transceiver 42 for sending and receiving information concerning radiation 12 detected by the first radiation detector 32a and the second radiation detector 32b together with various signals to and from the console 22. The transceiver 42 sends and receives information and various signals to and from the console 22 via a wireless or wired link.

A shield plate of lead or the like should preferably be placed over the side surface of at least the cassette controller 40 under the irradiated surface 28a of the casing 28, so as to protect the cassette controller 40 against damage that would otherwise be caused if the cassette controller 40 were irradiated with radiation 12.

The first radiation detector 32a and the second radiation detector 32b are identical in structure to each other. Accordingly, the first radiation detector 32a will primarily be described below.

As shown in FIG. 3, the first radiation detector 32a comprises a matrix of sets of solid-state detecting elements (pixels) 50 made of a material such as amorphous silicon (a-Si) or the like for performing photoelectric conversion, and thin-film transistors (TFTs) 52 for reading electric charges generated by the solid-state detecting elements 50 as electric signals. The TFTs 52, which are arranged in rows and columns in combination with the respective pixels 50, are connected to respective gate lines 54 extending parallel to the rows, and to respective signal lines 56 extending parallel to the columns. The gate lines 54 are connected to a line scanning driver 58, and the signal lines 56 are connected to a multiplexer 66 that serves as a reading circuit.

The gate lines 54 are supplied with control signals Von, Voff for turning on and off the TFTs 52 along the rows from the line scanning driver 58. The line scanning driver 58 comprises a plurality of switches SW1 for switching between the gate lines 54, and an address decoder 60 for outputting a selection signal for selecting one of the switches SW1 at a time. The address decoder 60 is supplied with an address signal from the cassette controller 40.

The signal lines 56 are supplied with electric charges stored in the pixels 50 through the TFTs 52 arranged in columns. The electric charges supplied to the signal lines 56 are amplified by amplifiers 62 connected respectively to the signal lines 56. The amplifiers 62 are connected through respective sample and hold circuits 64 to the multiplexer 66. The multiplexer 66 comprises a plurality of switches SW2 for successively switching between the signal lines 56, and an address decoder 68 for outputting a selection signal for selecting one of the switches SW2 at a time. The address decoder 68 is supplied with an address signal from the cassette controller 40. The multiplexer 66 has an output terminal connected to an A/D converter 70. A radiographic image signal generated by the multiplexer 66 based on electric charges from the sample and hold circuits 64 is converted by the A/D converter 70 into a digital image signal representing first radiographic image information, which is supplied to the cassette controller 40.

The second radiation detector 32b is structurally and operationally identical to the first radiation detector 32a. In the second radiation detector 32b, a radiographic image signal generated by the multiplexer 66 based on electric charges from the sample and hold circuits 64 is converted by the A/D converter 70 into a digital image signal representing second radiographic image information, which is supplied to the cassette controller 40.

As shown in FIG. 1, the cassette controller 40 includes an address signal generator 72 for supplying address signals to the address decoders 60, 68 of the line scanning drivers 58 and the multiplexers 66 of the first radiation detector 32a and the second radiation detector 32b, an image memory 74 for storing the first radiographic image information detected by the first radiation detector 32a and the second radiographic image information detected by the second radiation detector 32b, and an ID memory 76 for storing cassette ID information, which identifies the electronic cassette 18.

The electronic cassette 18 receives a transmission request signal for requesting transmission of the first radiographic image information and the second radiographic image information from the console 22 via the transceiver 42, and sends the cassette ID information stored in the ID memory 76, and the first radiographic image information and the second radiographic image information stored in the image memory 74, to the console 22 via the transceiver 42.

Figure 4A:
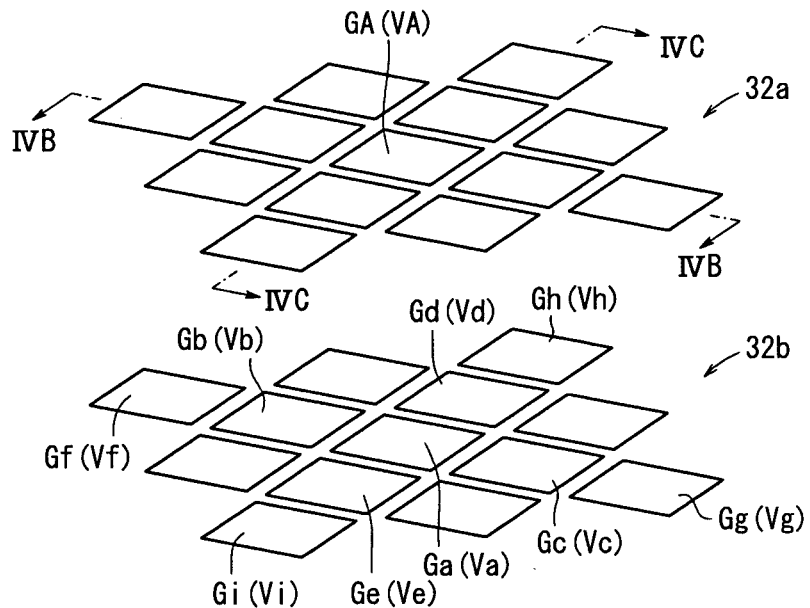
FIG. 4A is a view showing a pixel layout of first and second radiation detectors with respective groups of pixels disposed in confronting relation to each other.
Figure 4B:
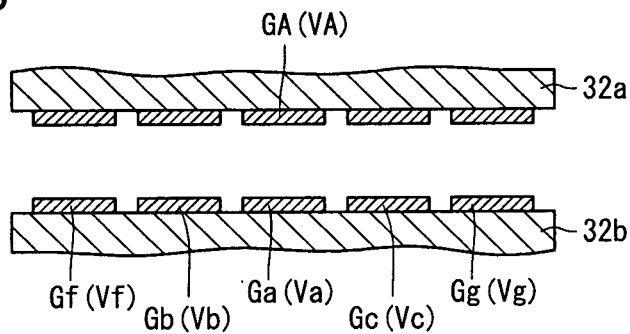
FIG. 4B is a cross-sectional view taken along line IVB-IVB of FIG. 4A.
Figure 4C:
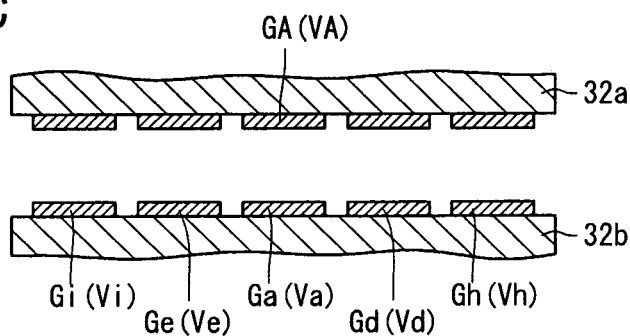
FIG. 4C is a cross-sectional view taken along line IVC-IVC of FIG. 4A.

The first radiation detector 32a and the second radiation detector 32b may be stacked one over the other, with respective groups of pixels thereof being disposed in confronting relation to each other, as shown in FIGS. 4A through 4C. Alternatively, the first radiation detector 32a and the second radiation detector 32b may be stacked one over the other, with respective groups of pixels thereof being displaced with respect to each other, as shown in FIGS. 5A through 8B.

Figure 5A:
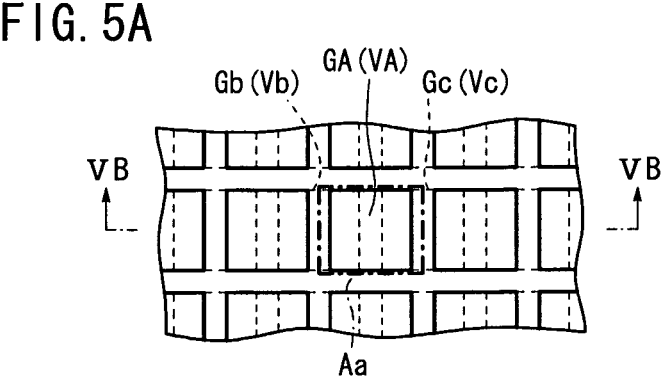
FIG. 5A is a view showing a pixel layout of two groups of confronting pixels, wherein pixels of one group are displaced ½ pixel pitch in a horizontal direction.
Figure 5B:
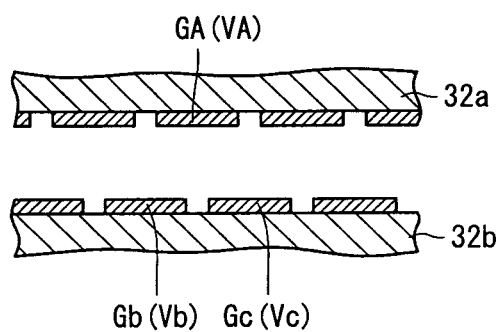
FIG. 5B is a cross-sectional view taken along line VB-VB of FIG. 5A.

In FIGS. 5A and 5B, the second radiation detector 32b is displaced with respect to the first radiation detector 32a by Ph/2 in a horizontal direction, where Ph represents the pixel pitch in the horizontal direction. With the pixel layout shown in FIGS. 5A and 5B, a substantial area taken up by one pixel is equal to the sum of the area taken up by a pixel of the first radiation detector 32a and the area of a space arranged between two horizontally adjacent pixels of the first radiation detector 32a, as indicated by the dot-and-dash line Aa in FIG. 5A.

Figure 6A:
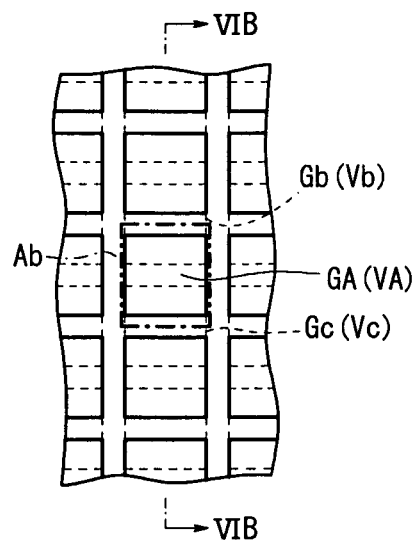
FIG. 6A is a view showing a pixel layout of two groups of confronting pixels, wherein pixels of one group are displaced ½ pixel pitch in a vertical direction.
Figure 6B:
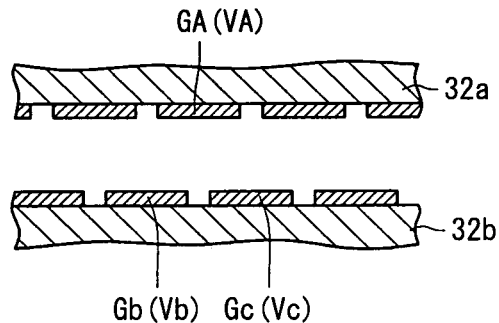
FIG. 6B is a cross-sectional view taken along line VIB-VIB of FIG. 6A.

In FIGS. 6A and 6B, the second radiation detector 32b is displaced with respect to the first radiation detector 32a by Pv/2 in a vertical direction, where Pv represents the pixel pitch in the vertical direction. With the pixel layout shown in FIGS. 6A and 6B, a substantial area taken up by one pixel is equal to the sum of the area taken up by a pixel of the first radiation detector 32a and the area of a space arranged between two vertically adjacent pixels of the first radiation detector 32a, as indicated by the dot-and-dash line Ab in FIG. 6A.

Figure 7A:
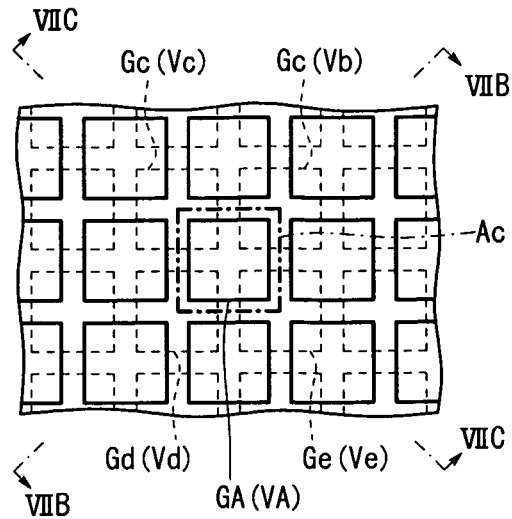
FIG. 7A is a view showing a pixel layout of two groups of confronting pixels, wherein the pixels of one group are displaced ½ pixel pitch in a horizontal direction and also are displaced ½ pixel pitch in a vertical direction.
Figure 7B:
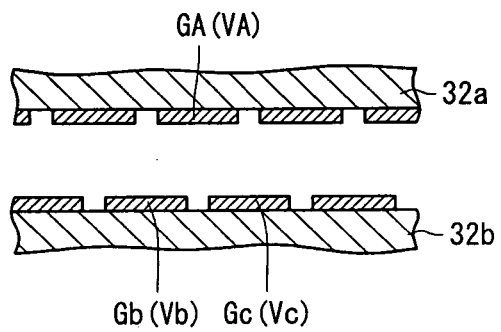
FIG. 7B is a cross-sectional view taken along line VIIB-VIIB of FIG. 7A.
Figure 7C:
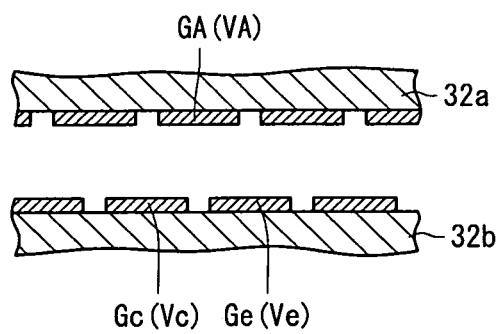
FIG. 7C is a cross-sectional view taken along line VIIC-VIIC of FIG. 7A.

In FIGS. 7A through 7C, the second radiation detector 32b is displaced with respect to the first radiation detector 32a by Ph/2 in the horizontal direction, and by Pv/2 in the vertical direction. With the pixel layout shown in FIGS. 7A through 7C, a substantial area taken up by one pixel is equal to an area surrounded by four lines, which bisect spaces between a pixel of the first radiation detector 32a and four adjacent pixels, which are disposed therearound, as indicated by the dot-and-dash line Ac in FIG. 7A.

Figure 8A:
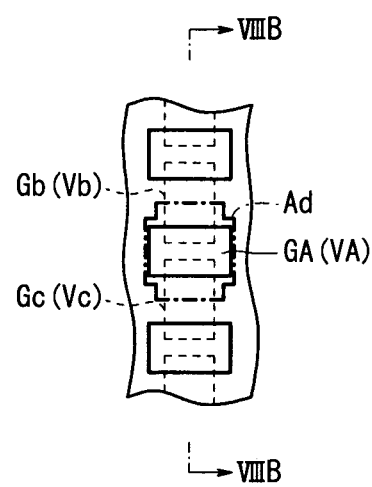
FIG. 8A is a view showing a pixel layout of two groups of confronting pixels, wherein the pixels of one group have a longer axis oriented horizontally and the pixels of the other group have a longer axis oriented vertically, and wherein the pixels of one group are displaced ½ pixel pitch in a vertical direction.
Figure 8B:
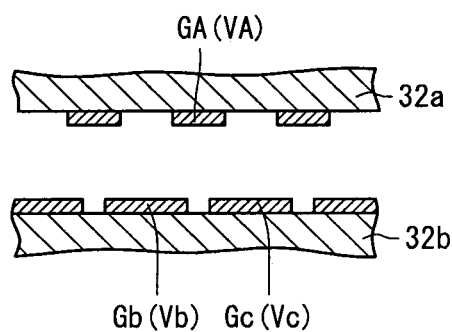
FIG. 8B is a cross-sectional view taken along line VIIIB-VIIIB of FIG. 8A.

In FIGS. 8A and 8B, the first radiation detector 32a and the second radiation detector 32b include oblong rectangular pixels as viewed in plan. The first radiation detector 32a is directed such that pixels thereof have a longer axis oriented horizontally, whereas the second radiation detector 32b is directed such that pixels thereof have a longer axis oriented vertically. The second radiation detector 32b is displaced with respect to the first radiation detector 32a by Pv/2 in the vertical direction. With the pixel layout shown in FIGS. 8A and 8B, a substantial area taken up by one pixel is equal to the sum of the area taken up by a pixel of the first radiation detector 32a and the area of a portion of a pixel of the second radiation detector 32b arranged between two vertically adjacent pixels of the first radiation detector 32a, as indicated by the dot-and-dash line Ad in FIG. 8A.

Radiographic image information of the subject 14, which is generated by the electronic cassette 18 and displayed on the display device 20 for interpretation by the user, typically a doctor or a radiological technician, basically is the first radiographic image information from the first radiation detector 32a. In the pixel layouts shown in FIGS. 5A through 8B, since the substantial area taken up by one pixel is increased, the value of a pixel of the first radiographic image information is supplemented in the following manner.

In the pixel layouts shown in FIGS. 5A through 8B, a pixel information table is prepared containing positional information (coordinate data) of two or four pixels of the second radiographic image information with respect to one pixel of the first radiographic image information. In the pixel layouts shown in FIGS. 5A and 5B, FIGS. 6A and 6B, and FIGS. 8A and 8B, the value VA of a pixel GA of the first radiographic image information and the sum $\{(Vb/2)+(Vc/2)\}$ of values Vb/2, Vc/2, which are respective one halves of the values Vb, Vc of two pixels Gb, Gc of the second radiographic image information, are added to each other, and the sum is regarded as the value $\{VA+(Vb/2)+(Vc/2)\}$ of the pixel GA of the first radiographic image information.

In the pixel layout shown in FIGS. 7A through 7C, the value VA of a pixel GA of the first radiographic image information and the sum $\{(Vb/2)+(Vc/2)+(Vd/2)+(Ve/2)\}$ of values Vb/2, Vc/2, Vd/2, Ve/2, which are respective one halves of the values Vb, Vc, Vd, Ve of four pixels Gb, Gc, Gd, Ge of the second radiographic image information, are added to each other, and the sum is regarded as the value $\{VA+(Vb/2)+(Vc/2)+(Vd/2)+(Ve/2)\}$ of the pixel GA of the first radiographic image information.

If the first radiation detector 32a contains a defective pixel, then the value of the defective pixel, which is present in the first radiographic image information from the first radiation detector 32a, is corrected using the second radiographic image information from the second radiation detector 32b. Processes for correcting such a defective pixel will be described later on.

Figure 9:
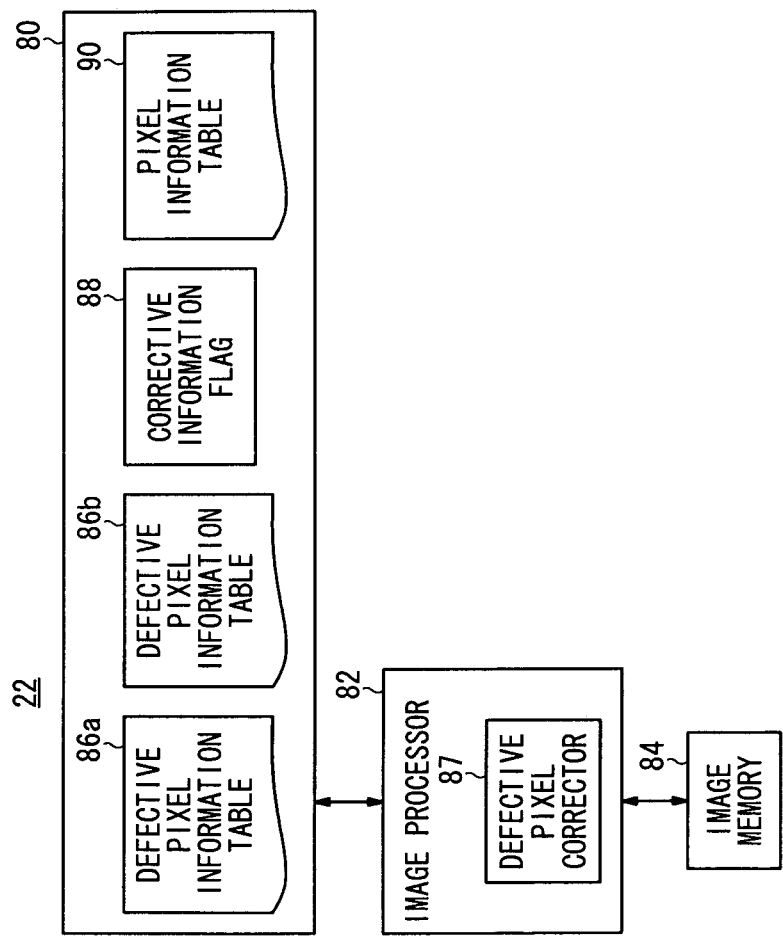
FIG. 9 is a block diagram of a console.

As shown in FIG. 9, the console 22 includes an information memory 80 for storing information concerning the electronic cassette 18, an image processor 82 for performing prescribed image processing sequences on radiographic image information received from the electronic cassette 18, and an image memory 84 for storing radiographic image information that has been processed by the image processor 82, and radiographic image information that is to be processed by the image processor 82.

The information memory 80 stores therein a first defective pixel information table 86a and a second defective pixel information table 86b, which correspond respectively to the first radiation detector 32a and the second radiation detector 32b, a corrective information flag 88, and a pixel information table 90, which is added only if the first radiation detector 32a and the second radiation detector 32b are stacked one over the other with respective groups of pixels being displaced with respect to each other, as shown in FIGS. 5A through 8B. The first defective pixel information table 86a and the second defective pixel information table 86b register therein positional information (coordinate data) of defective pixels that are present in the first radiation detector 32a and the second radiation detector 32b. The corrective information flag 88 registers therein information concerning a process of correcting defective pixels, i.e., information concerning a corrective process.

The information memory 80 also stores therein region information tables and corrective region information tables (not shown in FIG. 9) with respect to the first radiation detector 32a and the second radiation detector 32b. Specific details concerning the region information tables and corrective region information tables will be described later in connection with a managing method according to the embodiment of the present invention.

The image processor 82 includes a defective pixel corrector 87 for correcting at least the values of defective pixels of the first radiographic image information from the first radiation detector 32a.

The defective pixel corrector 87 performs a first correcting process, which uses an effective pixel corresponding to a defective pixel, a second correcting process, which uses an effective pixel corresponding to a defective pixel and peripheral pixels around the effective pixel, i.e., effective pixels in a corrective unit region, and a third correcting process, which is applied to the pixel layouts, wherein groups of pixels are displaced with respect to each other, and which uses peripheral pixels corresponding to a defective pixel. The corrective information flag 88 is used to indicate which one of the first, second, and third correcting processes is to be used. More specifically, when the corrective information flag 88 is set to "1", the first correcting process is used, when the corrective information flag 88 is set to "2", the second correcting process is used, and when the corrective information flag 88 is set to "3", the third correcting process is used.

The first, second, and third correcting processes will be described below with reference to FIGS. 4A through 8B. Among the two radiation detectors incorporated in the electronic cassette 18, the first radiation detector 32a is closer to the radiation source 16, and the second radiation detector 32b is more remote from the radiation source 16.

The first correcting process is applied to the pixel layout shown in FIGS. 4A through 4C, wherein the first radiation detector 32a and the second radiation detector 32b have respective groups of pixels disposed in confronting relation to each other. For correcting the value of a defective pixel GA of the first radiographic image information, the first correcting process uses an effective pixel Ga of the second radiographic image information that corresponds to the defective pixel GA. Specifically, positional information (coordinate data) of the defective pixel GA is read from the first defective pixel information table 86a, and the value Va of the effective pixel Ga, which is present at a position corresponding to the position of the defective pixel GA, is read from the second radiographic image information. The first radiographic image information is corrected using a value that is produced by multiplying the value Va by a coefficient as the value VA of the defective pixel GA. The coefficient is uniformly determined in advance from the distance between the first radiation detector 32a and the second radiation detector 32b.

The second correcting process also is applied to the pixel layout shown in FIGS. 4A through 4C, wherein the first radiation detector 32a and the second radiation detector 32b have respective groups of pixels disposed in confronting relation to each other. For correcting the value of a defective pixel GA of the first radiographic image information, the second correcting process uses an effective pixel Ga of the second radiographic image information, which corresponds to the defective pixel GA and peripheral pixels around the effective pixel, i.e., effective pixels in a corrective unit region. Specifically, the positional information (coordinate data) of the defective pixel GA is read from the first defective pixel information table 86a, and the value Va of the effective pixel Ga, which is present at a position corresponding to the position of the defective pixel GA and the values Vb, Vc, Vd, Ve of four peripheral pixels around the effective pixel Ga, i.e., two peripheral pixels Gb, Gc that are arrayed horizontally and two peripheral pixels Gd, Ge that are arrayed vertically, are read from the second radiographic image information. Then, an average value Gm of the four values Vb, Vc, Vd, Ve is determined. Alternatively, the values Vb, Vc, Vd, Ve, Vf, Vg, Vh, Vi of eight peripheral pixels around the effective pixel Ga, i.e., four peripheral pixels Gb, Gc, Gf, Gg that are arrayed horizontally and four peripheral pixels Gd, Ge, Gh, Gi that are arrayed vertically, are read from the second radiographic image information, and an average value Vm of the eight values Vb, Vc, Vd, Ve, Vf, Vg, Vh, Vi is determined. Then, a ratio (Ga/Gm) of the value Ga of the effective pixel Ga to the average value Gm is determined. An average value VF of the values of four peripheral pixels around the defective pixel GA of the first radiographic image information, i.e., two peripheral pixels GB, GC that are arrayed horizontally and two peripheral pixels GD, GE that are arrayed vertically, or an average value VM of the values of eight peripheral pixels around the defective pixel GA of the first radiographic image information, i.e., four peripheral pixels GB, GC, GF, GG that are arrayed horizontally and four peripheral pixels GD, GE, GH, GI that are arrayed vertically, is determined. The first radiographic image information is corrected by using VA= (Va/Vm)×VM as the value VA of the defective pixel GA. The second correcting process is capable of reflecting brightness characteristics of pixels adjacent to the defective pixel, so as to produce highly accurate corrective values. If any one of the pixels Ga through Gi of the second radiation detector 32b, e.g., the pixel Gb, is a defective pixel, then the value of the pixel Gb is corrected based on the values of four peripheral pixels around the defective pixel Gb. Thereafter, the value VA of the defective pixel GA is corrected in the same manner as described above.

The third correcting process is applied to the pixel layouts, wherein the first radiation detector 32a and the second radiation detector 32b are stacked one over the other with respective groups of pixels thereof being displaced with respect to each other, as shown in FIGS. 5A through 8B. For correcting the value VA of a defective pixel GA of the first radiographic image information, the third correcting process uses values of peripheral pixels of the second radiographic image information, which correspond to the defective pixel GA. More specifically, positional information (coordinate data) of the defective pixel GA is read from the first defective pixel information table 86a, the positional information of two pixels Gb, Gc or four pixels Gb, Gc, Gd, Ge, which correspond to the defective pixel GA, is read from the pixel information table 90, and the values Vb, Vc of the two pixels Gb, Gc or the values Vb, Vc, Vd, Ve of the four pixels Gb, Gc, Gd, Ge are read from the second radiographic image information. If the two pixels Gb, Gc are involved, then a value is produced by multiplying the sum {(Vb/2)+(Vc/2)} of respective halves of the values Vb, Vc of the two pixels Gb, Gc by a coefficient, and the first radiographic image information is corrected using the produced value as the value VA of the defective pixel GA. If the four pixels Gb, Gc, Gd, Ge are involved, then a value is produced by multiplying the sum {(Vb/2)+(Vc/2)+(Vd/2)+(Ve/2)} of respective halves of the values Vb, Vc, Vd, Ve of the four pixels Gb, Gc, Gd, Ge by a coefficient, and the first radiographic image information is corrected using the produced value as the value VA of the defective pixel GA. The coefficient is determined uniformly in advance from the distance between the first radiation detector 32a and the second radiation detector 32b. If any one of the two pixels Gb, Gc or the four pixels Gb, Gc, Gd, Ge of the second radiation detector 32b, e.g., the pixel Gb, is a defective pixel, then the value of the pixel Gb is corrected based on the values of the four peripheral pixels around the defective pixel Gb. Thereafter, the value VA of the defective pixel GA is corrected in the same manner as described above.

The first radiographic image information, which has been corrected by the first correcting process or the second correcting process, is then processed by the image processor 82 into radiographic image information for the user to interpret, and then the radiographic image information is output to the display device 20. The first radiographic image information, which has been corrected by the third correcting process, is supplemented by increasing the substantial area taken up by the pixel, based on the second radiographic image information as described above. Then, the supplemented first radiographic image information is processed by the image processor 82 into radiographic image information for the user to interpret, and then the radiographic image information is output to the display device 20.

A managing method according to the present embodiment for the first radiation detector 32a and the second radiation detector 32b, which are included in the electronic cassette 18, will be described below with reference to FIGS. 10 through 25.

According to the managing method, positions of defective pixels of a plurality of manufactured radiation detectors 32 are recognized. When the first radiation detector 32a and the second radiation detector 32b are stacked and assembled into the electronic cassette 18, recognized positions of the defective pixels are referred to, and the defective pixels of the first radiation detector 32a and the defective pixels of the second radiation detector 32b are not superposed on each other. In the pixel layout shown in FIGS. 4A through 4C, defective pixels of the first radiation detector 32a and defective pixels of the second radiation detector 32b are not superposed on each other in any of the same pixel positions. In the pixel layout shown in FIGS. 5A through 8B, defective pixels of the first radiation detector 32a and defective pixels of the second radiation detector 32b are not even partially superposed one on the other.

There are three managing methods, i.e., a first managing method, a second managing method, and a third managing method, available for managing the first radiation detector 32a and the second radiation detector 32b.

Figure 10:
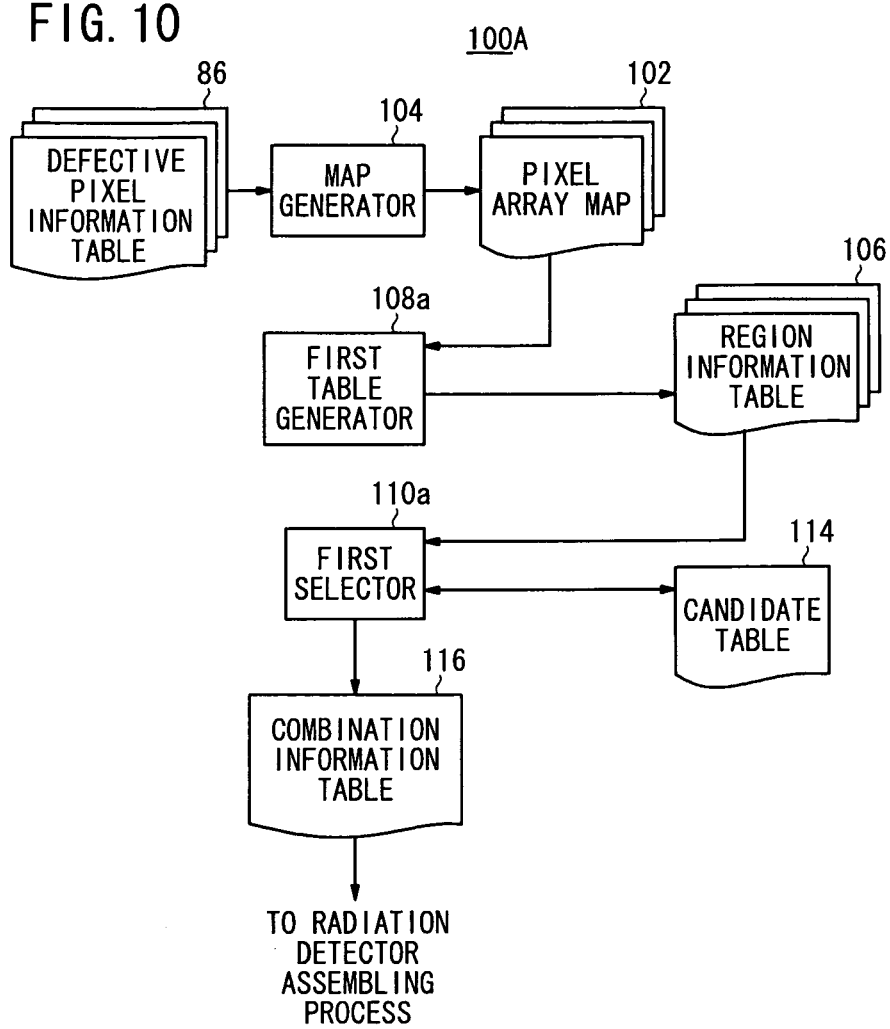
FIG. 10 is a block diagram of a first management system.

The first managing method is carried out by a first management system 100A (see FIG. 10) having a computer. As shown in FIG. 10, the first management system 100A includes a map generator 104 for generating a pixel array map 102 containing a two-dimensional array of defective pixels and effective pixels based on defective pixel information tables 86 corresponding to a plurality of manufactured radiation detectors 32, a first table generator 108a for generating a plurality of region information tables 106 corresponding to the manufactured radiation detectors 32 and each registering therein positional information of first regions including defective pixels and second regions free of defective pixels, and a first selector 110a for selecting, from among the manufactured radiation detectors 32, two radiation detectors first and second regions of which are superposed one on the other when the two radiation detectors are stacked together, based on the generated region information tables 106.

The first managing method will be described in detail below with reference to FIGS. 11 through 16.

Figure 11:
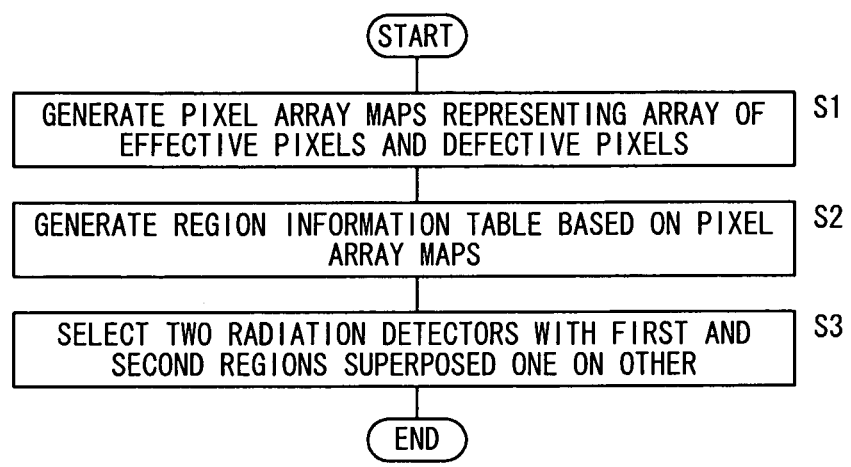
FIG. 11 is a flowchart of a first managing method.
Figure 13A:
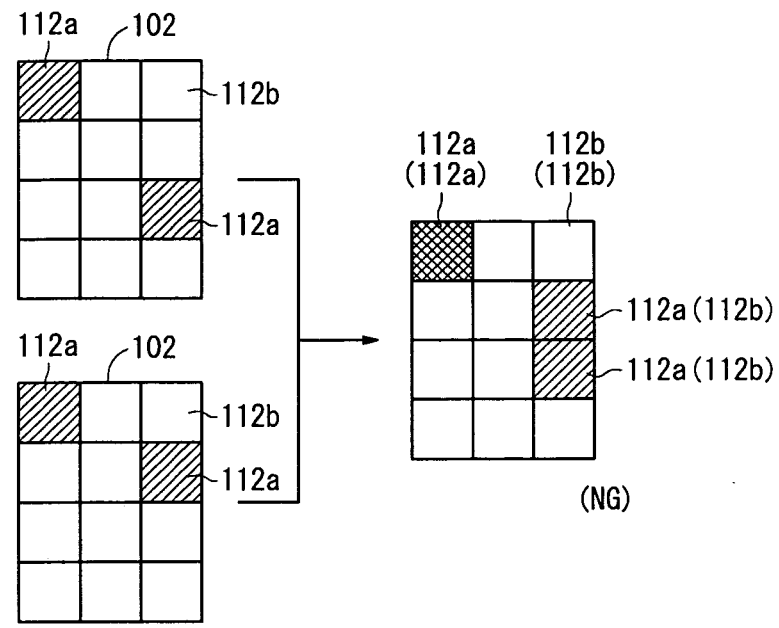
FIG. 13A is a diagram showing a combination of two pixel array maps with two first regions stacked one on the other.
Figure 13B:
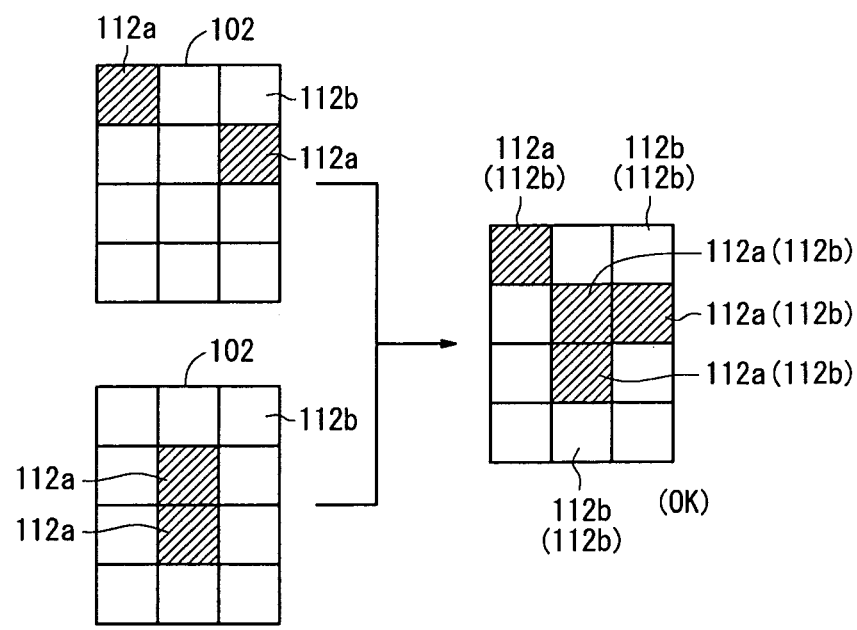
FIG. 13B is a diagram showing a combination of two pixel array maps with first regions not stacked one on the other.

In steps S1 and S2 shown in FIG. 11, a plurality of region information tables 106 corresponding to a plurality of manufactured radiation detectors 32 are generated. Each of the region information tables 106 registers therein positional information of first regions including defective pixels and second regions free of defective pixels. The number of pixels included in each of the first regions, i.e., the number of pixels along a horizontal direction and the number of pixels along a vertical direction, is the same as the number of pixels included in each of the second regions, i.e., the number of pixels along a horizontal direction and the number of pixels along a vertical direction.

For the sake of brevity, it is assumed that each of the first and second regions contains 10 pixels arrayed in horizontal rows and 10 pixels arrayed in vertical columns, and each of the first and second radiation detectors 32a, 32b contains 30 pixels arrayed in horizontal rows and 40 pixels arrayed in vertical columns.

In step S1 shown in FIG. 11, the map generator 104 of the first management system 100A reads positional information of defective pixels from the defective pixel information tables 86, which were generated when the radiation detectors 32 were manufactured, and based on the read positional information, generates pixel array maps 102 representing an array of effective pixels and defective pixels for the respective radiation detectors 32. Each of the pixel array maps 102 comprises an array of bits corresponding to the array of pixels of the radiation detectors 32, and has a one-bit depth (0: effective pixel, 1: defective pixel). A bit of the pixel array map 102 that is aligned with the position of a defective pixel is set to "1", and a bit of the pixel array map 102 that is aligned with the position of an effective pixel is set to "0". Thereafter, the pixel array map 102 is divided into a total of 12 regions, including four regions arrayed in vertical columns and three regions arrayed in horizontal rows. Each of the regions comprises 10 bits arrayed in horizontal rows and 10 bits arrayed in vertical columns.

In step S2, the first table generator 108a of the first management system 100A registers positional information of first regions 112a, shown as hatched in FIG. 12, which contain even one bit set to "1", from among the 12 regions of the pixel array map 102, in a region information table 106. Positional information of a first region 112a is represented by information of a row and column of a first bit of the first region 112a, and information of a row and column of a final bit of the first region 112a. The first table generator 108a also registers positional information of second regions, shown blank in FIG. 12, which contain all bits set to "0", from among the 12 regions of the pixel array map 102, in the region information table 106. The first table generator 108a performs the above process on all the manufactured radiation detectors 32, thereby generating a plurality of region information tables 106. For example, if six radiation detectors 32 are manufactured, then the first table generator 108a generates six region information tables 106.

In step S3, the first selector 110a of the first management system 100A selects, from among the manufactured radiation detectors 32, two radiation detectors 32, first and second regions 112a, 112b of which are superposed one on the other when the two radiation detectors 32 are stacked together, based on the generated region information tables 106. Specifically, if six radiation detectors 32 are manufactured, then a first radiation detector 32 is given as one of the six radiation detectors 32, and another radiation detector, which matches the first radiation detector 32, is selected, so that at least one radiation detector 32 is extracted as a candidate. The ID of the extracted radiation detector 32 is registered in a first record of a candidate table 114, as shown in FIG. 10. In the example shown in FIG. 13A, when two radiation detectors 32 are stacked one over the other in alignment with each other, i.e., when two corresponding pixel array maps 102 are superposed by the computer, two upper left first regions 112a become superposed on each other. Therefore, this combination of two radiation detectors 32 is not employed. In the example shown in FIG. 13B, when two radiation detectors 32 are stacked one over the other in alignment with each other, no first regions 112a thereof are overlapped. Therefore, this combination of two radiation detectors 32 is registered as a candidate in the candidate table 114. Similarly, an nth radiation detector 32 is given as one of the six radiation detectors 32, and another radiation detector, which matches the nth radiation detector 32, is selected, so that at least one radiation detector 32 is extracted as a candidate. The ID of the extracted radiation detector 32 is registered in an nth record of the candidate table 114. Based on an input action of the user and other calculations, an optimum combination of radiation detectors 32 is determined from among the contents registered in the candidate table 114, and then the optimum combination is registered in a combination information table 116 (see FIG. 10). Combinations of two radiation detectors 32, i.e., combinations of IDs thereof, first regions 112a of which are not superposed one on the other, are successively registered in the combination information table 116. More specifically, a process, for example, which is to be described below, is used in order to determine a combination of two radiation detectors 32 based on an input action of the user. The display device 20 displays respective pixel array maps 102 of two radiation detectors 32, the first regions 112a thereof being displayed in yellow, and the second regions 112b thereof being displayed in white. When the two pixel array maps 102 are superposed one on the other, any regions where the first regions 112a are superposed on each other are displayed in red, any regions where the first and second regions 112a, 112b are superposed on each other are displayed in yellow, and any regions where the second regions 112b are superposed on each other are displayed in white. The user confirms a combination of two radiation detectors 32, the displayed pixel array maps 102 of which are free of red regions, and registers the IDs of the two radiation detectors 32 that have been confirmed in the combination information table 116.

When a first radiation detector 32a and a second radiation detector 32b are subsequently stacked and assembled into an electronic cassette 18, the user refers to the combination of the IDs of the two radiation detectors 32, which have been registered in the combination information table 116. Then, the user assembles the two radiation detectors 32, which have registered IDs as the first radiation detector 32a and the second radiation detector 32b, into the electronic cassette 18.

Thereafter, the radiographic image capturing system 10, which incorporates therein the electronic cassette 18, manages the first radiation detector 32a and the second radiation detector 32b. The defective pixel information tables 86 corresponding to the first radiation detector 32a and the second radiation detector 32b assembled in the electronic cassette 18, i.e., the first defective pixel information table 86a and the second defective pixel information table 86b, pixel array maps 102 thereof, i.e., a first pixel array map 102a and a second pixel array map 102b, and region information tables 106 thereof, i.e., a first region information table 106a and a second region information table 106b, are stored in the information memory 80 of the console 22 (see FIG. 14).

As shown in FIG. 14, the console 22 includes a first management processor 120A for managing the electronic cassette 18, which is incorporated in the radiographic image capturing system 10. The first management processor 120A has a function to reflect positions of defective pixels, which are newly discovered in a regular or irregular defective pixel detecting process, which may be carried out, for example, during calibration of the electronic cassette 18 including the first radiation detector 32a and the second radiation detector 32b, in various tables, so as to indicate deteriorated states of the first radiation detector 32a and the second radiation detector 32b.

As shown in FIG. 14, the first management processor 120A includes a first table updater 122a, a first determiner 124a, a first warning output section 126a, a layout display section 128, and a first color display section 130a.

The first table updater 122a reflects the positions of defective pixels, which are newly discovered in the defective pixel detecting process, in the first region information table 106a and the second region information table 106b. The first determiner 124a determines whether or not the first regions 112a are superposed one on the other based on the first region information table 106a and the second region information table 106b. The first warning output section 126a issues a warning if the first determiner 124a discovers that the first regions 112a are superposed on each other.

The layout display section 128 models layouts of the first regions 112a and the second regions 112b of the first radiation detector 32a and the second radiation detector 32b, based on the first region information table 106a and the second region information table 106b, and displays the modeled layouts in a superposed relationship. The first color display section 130a displays regions where the first regions 112a are superposed one on the other in a first color, e.g., orange, displays regions where the first and second regions 112a, 112b are superposed one on the other in a second color, e.g., yellow, and displays regions where the second regions 112b are superposed one on the other in a third color, e.g., white. In particular, the first color display section 130a displays regions where the first regions 112a are superposed one on the other and also defective pixels are superposed one on the other, in a different color, e.g., red.

Operation of the first management processor 120A will be described below with reference to FIGS. 15 and 16.

The first management processor 120A performs the defective pixel detecting process referred to above. If a new defective pixel is found in the defective pixel detecting process, the first table updater 122a adds (reflects) the positional information concerning the new defective pixel to (in) the first defective pixel information table 86a and the second defective pixel information table 86b.

Figure 15:
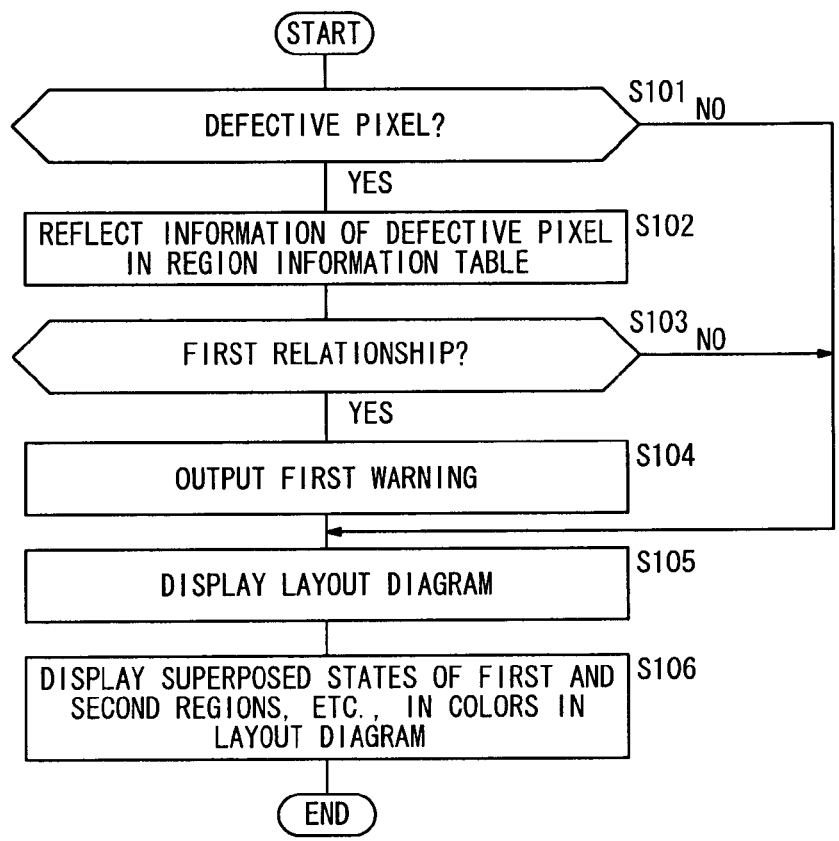
FIG. 15 is a flowchart of an operation sequence of the first management processor.
Figure 16:
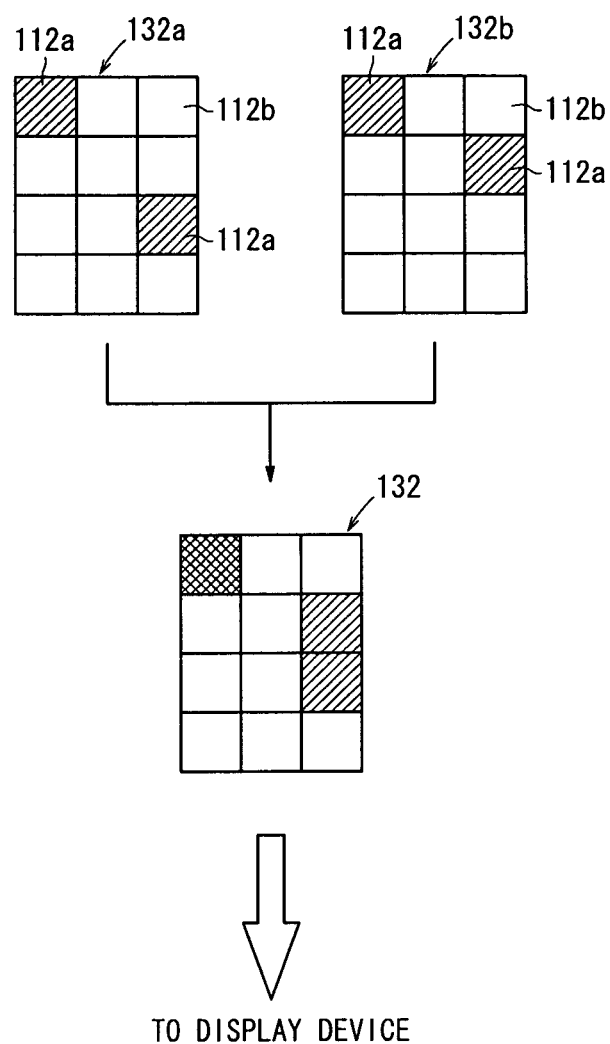
FIG. 16 is a diagram showing a process of stacking a first layout image and a second layout image to produce a layout image, and displaying the layout image on a display device.

In step S101 shown in FIG. 15, the first management processor 120A determines whether or not there is a new defective pixel. If there is a new defective pixel, then control proceeds to step S102. In step S102, the first table updater 122a sets a bit, which corresponds to the positional information of the new defective pixel in the first pixel array map 102a and the second pixel array map 102b, to "1", and reflects a first region 112a, which has correspondingly changed from a second region 112b in the first region information table 106a and the second region information table 106b. For example, if a new defective pixel is discovered in the first radiation detector 32a, then the first table updater 122a reflects the positional information of the new defective pixel in the first pixel array map 102a. When a corresponding second region 112b changes to a first region 112a in the first pixel array map 102a, the first table updater 122a reflects the positional information of the new defective pixel in the first region information table 106a. A similar sequence is carried out if a new defective pixel is found in the second radiation detector 32b.

In step S103, the first determiner 124a determines whether or not there is a region having a first relationship, i.e., a region where the first regions 112a are superposed one on the other, when the first radiation detector 32a and the second radiation detector 32b are superposed on each other, based on the first region information table 106a and the second region information table 106b.

If there is a region having a first relationship, then control proceeds to step S104, in which the first warning output section 126a displays the number of defective pixels in the region where the first regions 112a are superposed one on the other, and displays a first warning, i.e., a message indicative of the first relationship, on the display device 20. If necessary, the first warning output section 126a outputs the message as a voice message to a speaker. If there is a region where defective pixels are superposed one on the other, then the first warning output section 126a may also display the number of such defective pixels, as well as a corresponding message on the display device 20, and may also output corresponding information thereof from the speaker.

After step S104, or if there is not a region having a first relationship in step S103, or if no new defective pixel is discovered in step S101, then control proceeds to step S105. In step S105, as shown in FIG. 16, the layout display section 128 displays, on the display device 20, a layout diagram 132, which represents a superposition of a first layout diagram 132a that models the layout of the first regions 112a and the second regions 112b of the first radiation detector 32a based on the first region information table 106a, and a second layout diagram 132b that models the layout of the first regions 112a and the second regions 112b of the second radiation detector 32b based on the second region information table 106b.

In step S106, the first color display section 130a displays, in the layout diagram 132 displayed on the display device 20, regions where the first regions 112a are superposed one on the other in a first color, e.g., orange, displays regions where the first and second regions 112a, 112b are superposed one on the other in a second color, e.g., yellow, and displays regions where the second regions 112b are superposed one on the other in a third color, e.g., white. In particular, the first color display section 130a displays regions where the first regions 112a are superposed one on the other and also defective pixels are superposed one on the other, in a different color, e.g., red. The first color display section 130a may display such regions in colors at the same time that the first warning output section 126a issues a warning. Alternatively, the first warning output section 126a may issue a warning after the first color display section 130a has displayed such regions in colors.

The operation sequence of steps S101 through S106 is carried out each time the regular or irregular defective pixel detecting process is brought to an end.

The second managing method will be described below with reference to FIGS. 17 through 19B. The second managing method is carried out by a second management system 100B (see FIG. 17) having a computer.

Figure 17:
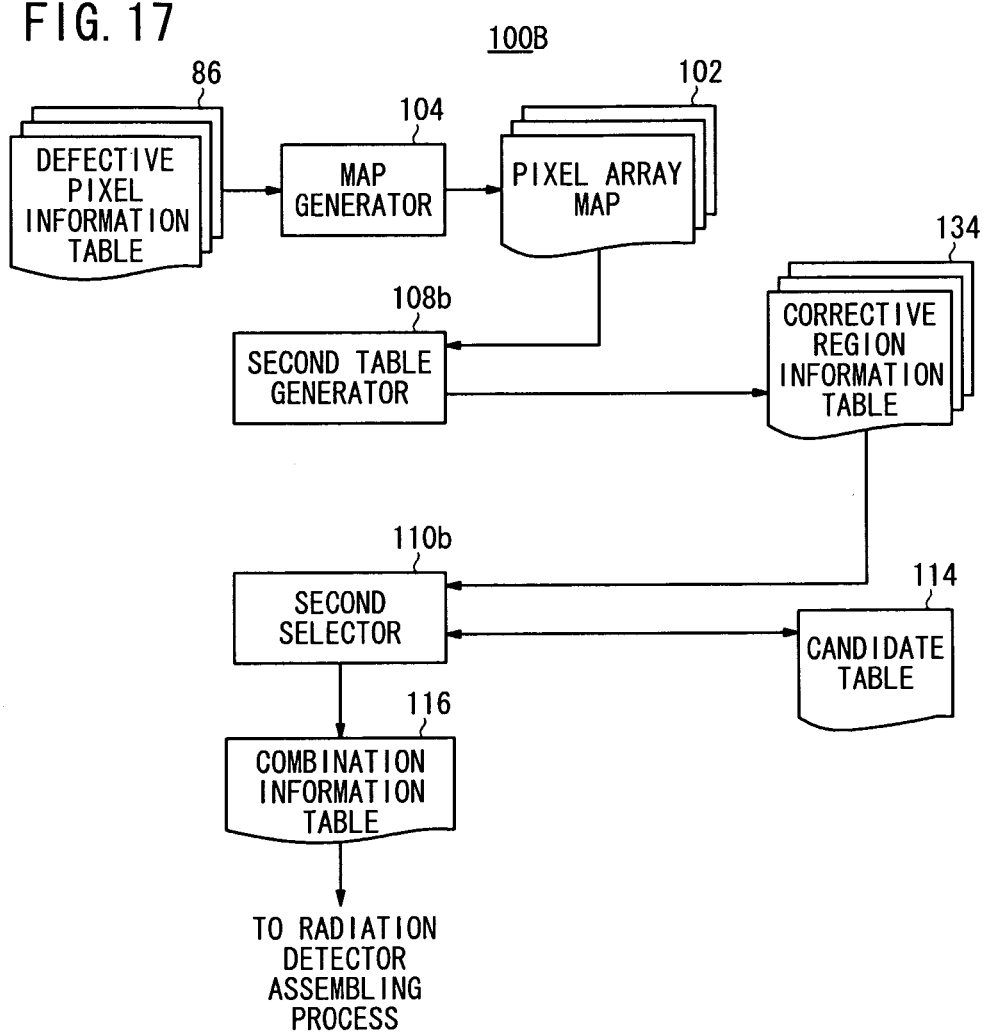
FIG. 17 is a block diagram of a second management system.

As shown in FIG. 17, the second management system 100B includes the map generator 104 described above, a second table generator 108b for generating a plurality of corrective region information tables 134 corresponding to a plurality of manufactured radiation detectors 32, each registering therein positional information of corrective regions including defective pixels, and a second selector 110b for selecting, from among the manufactured radiation detectors 32, two radiation detectors corrective regions of which are not even partially superposed one on the other when the two radiation detectors are stacked together, based on the generated corrective region information tables 134.

The second managing method will be described in detail below with reference to FIGS. 18, 19A and 19B.

Figure 18:
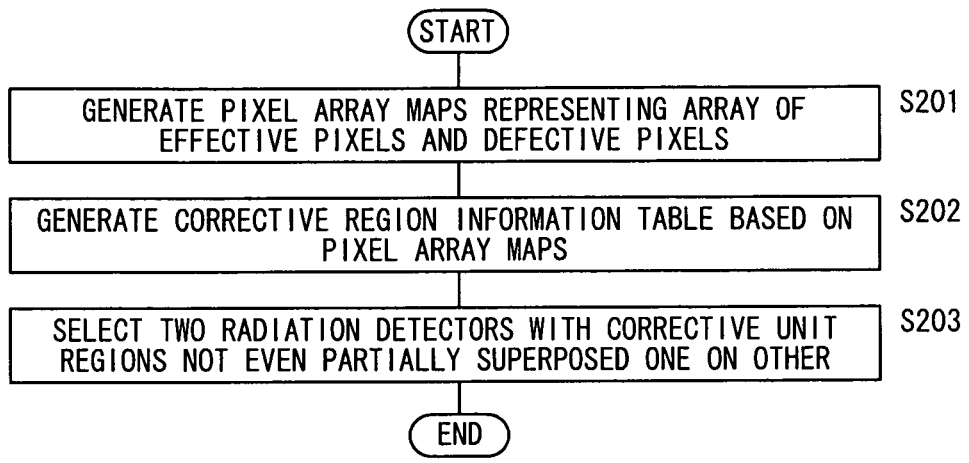
FIG. 18 is a flowchart of a second managing method.
Figure 19A:
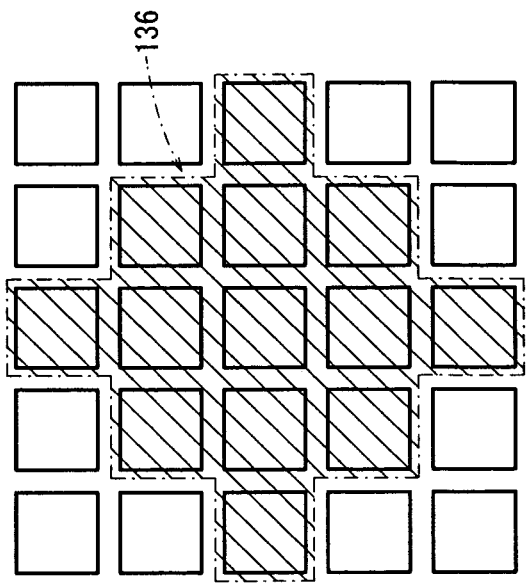
FIGS. 19A and 19B are diagrams showing pixel arrays of corrective unit regions.
Figure 19B:
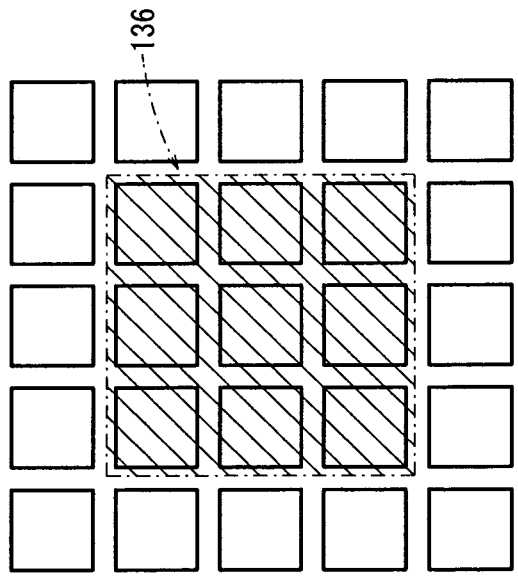

In steps S201 and S202 shown in FIG. 18, a plurality of corrective region information tables 134 corresponding to a plurality of manufactured radiation detectors 32 are generated. Each of the corrective region information tables 134 registers therein positional information of corrective unit regions 136 (see FIGS. 19A and 19B). Each of the corrective unit regions 136 refers to a region including a defective pixel and peripheral pixels used in correcting the defective pixel. More specifically, the corrective unit region 136 may have a matrix of pixels arrayed in three horizontal rows and three vertical columns, as indicated by the dot-and-dash lines in FIG. 19A, or a matrix of pixels arrayed in three horizontal rows and three vertical columns with additional pixels on respective rows and columns including the defective pixel, as indicated by the dot-and-dash lines in FIG. 19B.

More specifically, in step S201 shown in FIG. 18, the map generator 104 of the second management system 100B generates pixel array maps 102 representing an array of effective pixels and defective pixels for the respective radiation detectors 32, based on the contents of the defective pixel information tables 86, which were generated when the radiation detectors 32 were manufactured, as in step S1 described above.

In step S202, the second table generator 108b of the second management system 100B sets corrective unit regions 136 including defective pixels with respect to the respective pixel array maps 102, and registers the positional information of the corrective unit regions 136, i.e., information of the rows and columns of bits included in the corrective unit regions 136, in a corrective region information table 134. The second table generator 108b performs the above process on all of the manufactured radiation detectors 32, thereby generating a plurality of corrective region information tables 134. For example, if six radiation detectors 32 have been manufactured, then the second table generator 108b generates six corrective region information tables 134.

In step S203, the second selector 110b of the second management system 100B selects, from among the manufactured radiation detectors 32, two radiation detectors 32, corrective unit regions 136 of which are not even partially superposed one on the other when the two radiation detectors 32 are stacked together, based on the generated corrective region information tables 134. More specifically, if six radiation detectors 32 have been manufactured, then an nth radiation detector 32 is given as one of the six radiation detectors 32, and another radiation detector, which matches the nth radiation detector 32, is selected, so that at least one radiation detector 32 is extracted as a candidate. The ID of the extracted radiation detector 32 is registered in an nth record of a candidate table 114, as shown in FIG. 17. Based on an input action of the user and other calculations, an optimum combination of radiation detectors 32 is determined from the contents registered in the candidate table 114, and then the optimum combination is registered in a combination information table 116 (see FIG. 17). Combinations of two radiation detectors 32, i.e., combinations of IDs thereof, corrective unit regions 136 of which are not even partially superposed one on the other, are successively registered in the combination information table 116.

When a first radiation detector 32a and a second radiation detector 32b are subsequently stacked and assembled into an electronic cassette 18, the user refers to the ID combination of the two radiation detectors 32, which have been registered in the combination information table 116. Then, the user assembles the two radiation detectors 32, which have registered IDs as the first radiation detector 32a and the second radiation detector 32b, into an electronic cassette 18.

Thereafter, the radiographic image capturing system 10 incorporating the electronic cassette 18 manages the first radiation detector 32a and the second radiation detector 32b, in accordance with the first managing method. The first defective pixel information table 86a and the second defective pixel information table 86b corresponding to the first radiation detector 32a and the second radiation detector 32b assembled in the electronic cassette 18, the first pixel array map 102a and the second pixel array map 102b, and a first corrective region information table 134a and a second corrective region information table 134b, are stored respectively in the information memory 80 of the console 22. Furthermore, a first region information table 106a, which registers therein positional information of first regions 112a including defective pixels and second regions 112b free of defective pixels with respect to the first radiation detector 32a, and a second region information table 106b, which registers therein positional information of first regions 112a including defective pixels and second regions 112b free of defective pixels with respect to the second radiation detector 32b, are generated and stored in the information memory 80. The first region information table 106a and the second region information table 106b, which have been stored as described above, are updated when a new defective pixel is added.

Figure 20:
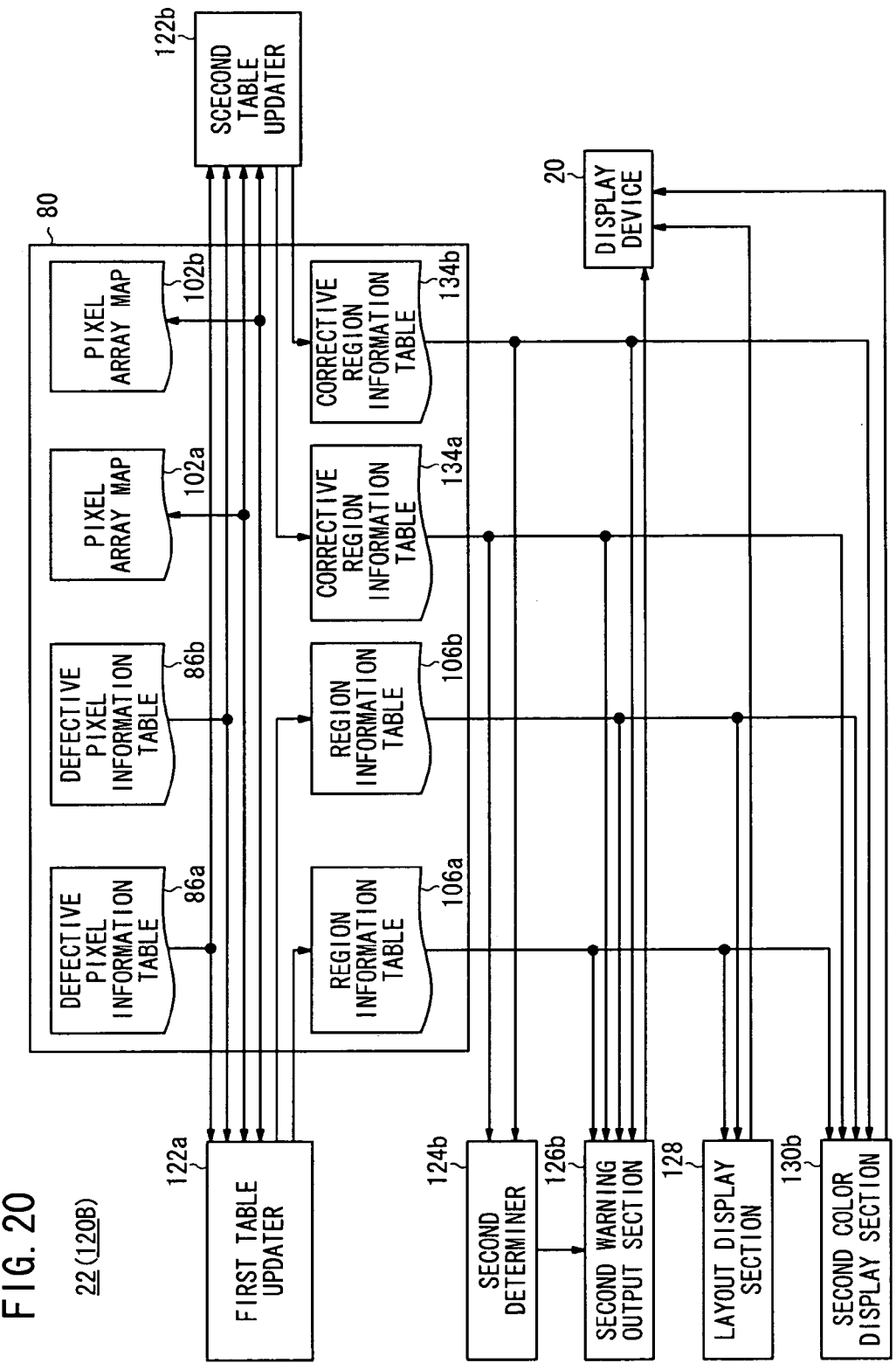
FIG. 20 is a block diagram of a second management processor of the console.

As shown in FIG. 20, the console 22 includes a second management processor 120B for managing the electronic cassette 18 that is incorporated in the radiographic image capturing system 10. As with the first management processor 120A, the second management processor 120B has a function to reflect positions of defective pixels that are newly discovered in a regular or irregular defective pixel detecting process, which is carried out on the electronic cassette 18 including the first radiation detector 32a and the second radiation detector 32b, in various tables, to thereby indicate deteriorated states of the first radiation detector 32a and the second radiation detector 32b.

The second management processor 120B includes a first table updater 122a, a second table updater 122b, a second determiner 124b, a second warning output section 126b, a layout display section 128, and a second color display section 130b.

The first table updater 122a is the same as the first table updater 122a described above with reference to FIG. 14, and thus will not be described in detail below. The second table updater 122b reflects in the first corrective region information table 134a and the second corrective region information table 134b positions of defective pixels that are newly discovered in the defective pixel detecting process. The second determiner 124b determines whether or not the corrective unit regions 136 are even partially superposed one on the other based on the first corrective region information table 134a and the second corrective region information table 134b. The second warning output section 126b issues a warning if the second determiner 124b discovers that the corrective unit regions 136 are even partially superposed one on the other.

The layout display section 128 models layouts of the first regions 112a and the second regions 112b of the first radiation detector 32a and the second radiation detector 32b, based on the first region information table 106a and the second region information table 106b, and displays the modeled layouts in a superposed relationship. The second color display section 130b displays regions where the first regions 112a are superposed one on the other, and where the corrective unit regions 136 are even partially superposed one on the other in a first color, e.g., orange, displays regions where the first regions 112a are superposed one on the other and the corrective unit regions 136 are not partially superposed one on the other in a second color, e.g., yellow, displays regions where the first and second regions 112a, 112b are superposed one on the other in a third color, e.g., blue, and displays regions where the second regions 112b are superposed one on the other in a fourth color, e.g., white. In particular, the second color display section 130b displays regions where the first regions 112a are superposed one on the other and defective pixels are superposed one on the other in a different color, e.g., red.

Operation of the second management processor 120B will be described below with reference to FIG. 21.

The second management processor 120B performs the defective pixel detecting process referred to above. If a new defective pixel is discovered in the defective pixel detecting process, then the first table updater 122a adds (reflects) positional information of the new defective pixel to (in) the first defective pixel information table 86a and the second defective pixel information table 86b.

Figure 21:
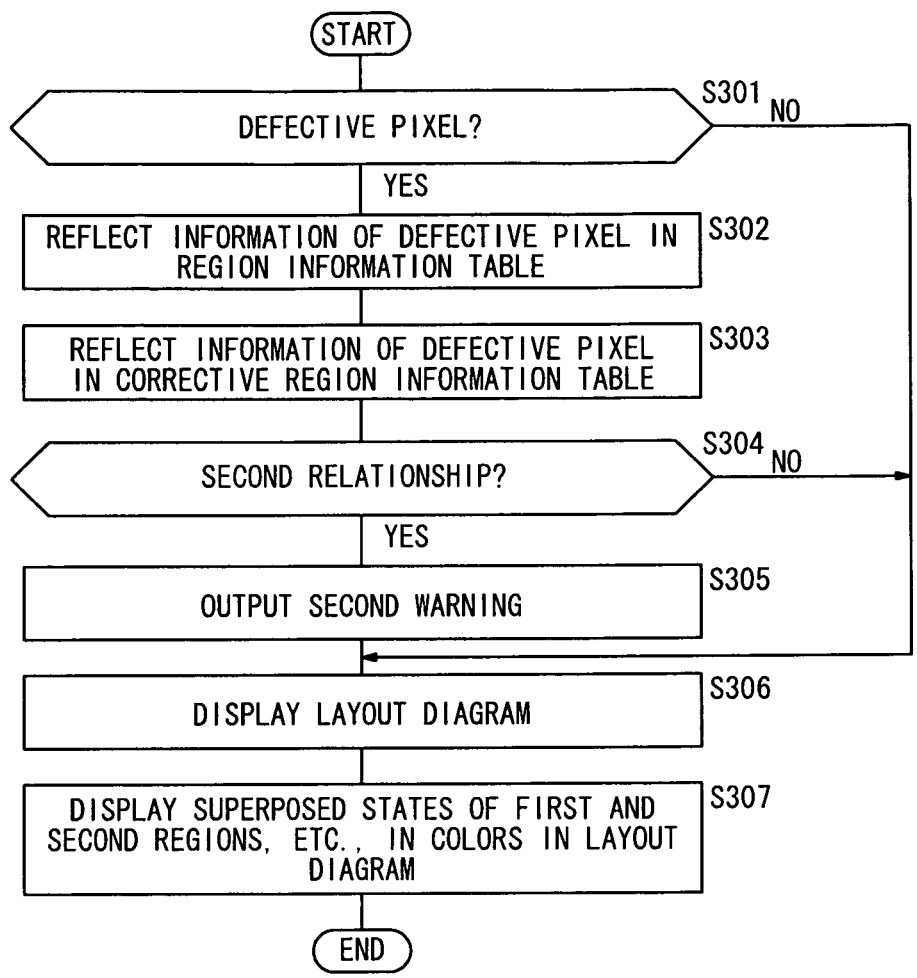
FIG. 21 is a flowchart of an operation sequence of the second management processor.

In step S301 shown in FIG. 21, the second management processor 120B determines whether or not there is a new defective pixel. If there is a new defective pixel, then control proceeds to step S302. In step S302, the first table updater 122a sets the bit, which corresponds to positional information of the new defective pixel in the first pixel array map 102a and the second pixel array map 102b, to "1", and reflects a first region 112a, which has correspondingly changed from a second region 112b, in the first region information table 106a and the second region information table 106b.

In step S303, the second table updater 122b registers (reflects) positional information of the corrective unit region 136, which corresponds to the presently added defective pixel, in the first corrective region information table 134a and the second corrective region information table 134b. For example, if a new defective pixel is discovered in the first radiation detector 32a, then the second table updater 122b reflects positional information of the new defective pixel in the first pixel array map 102a. When a corresponding second region 112b changes to a first region 112a in the first pixel array map 102a, the second table updater 122b reflects positional information of the new defective pixel in the first region information table 106a. Positional information of the corrective unit region 136, which corresponds to the new defective pixel, is reflected in the first corrective region information table 134a. A similar sequence is carried out if a new defective pixel is discovered in the second radiation detector 32b.

In step S304, the second determiner 124b determines whether or not there is a region having a second relationship, i.e., a region where the corrective unit regions 136 are even partially superposed one on the other, when the first radiation detector 32a and the second radiation detector 32b are stacked one on the other, based on the first corrective region information table 134a and the second corrective region information table 134b.

If there is a region having the second relationship, then control proceeds to step S305, in which the second warning output section 126b displays the number of defective pixels in the region where the first regions 112a are superposed one on the other, the number of defective pixels in the region where the corrective unit regions 136 are superposed one on the other, and a second warning, i.e., a message indicative of the second relationship, on the display device 20. If necessary, the second warning output section 126b may output the message as a voice message to a speaker. If there is a region where defective pixels are superposed one on the other, then the second warning output section 126b may also display the number of such defective pixels together with a corresponding message on the display device 20, and may also output such information from the speaker.

After step S305, or if there is not a region having the second relationship in step S304, or if no new defective pixel is discovered in step S301, then control proceeds to step S306. In step S306, as shown in FIG. 16, the layout display section 128 displays, on the display device 20, a layout diagram 132, which represents a superposition of a first layout diagram 132a that models the layout of the first regions 112a and the second regions 112b of the first radiation detector 32a based on the first region information table 106a, and a second layout diagram 132b that models the layout of the first regions 112a and the second regions 112b of the second radiation detector 32b based on the second region information table 106b.

In step S307, the second color display section 130b displays, in the layout diagram 132 displayed on the display device 20, regions where the first regions 112a are superposed one on the other and the corrective unit regions 136 are even partially superposed one on the other in a first color, e.g., orange, displays regions where the first regions 112a are superposed one on the other and the corrective unit regions 136 are not even partially superposed one on the other in a second color, e.g., yellow, displays regions where the first and second regions 112a, 112b are superposed one on the other in a third color, e.g., blue, and displays regions where the second regions 112b are superposed one on the other in a fourth color, e.g., white. In particular, the second color display section 130b displays regions where the first regions 112a are superposed one on the other, and also where defective pixels are superposed one on the other, in a different color, e.g., red.

The operation sequence of steps S301 through S307 is carried out each time that the regular or irregular defective pixel detecting process is brought to an end.

The third managing method will be described below with reference to FIGS. 22 and 23. The third managing method is carried out by a third management system 100C (see FIG. 22) having a computer.

Figure 22:
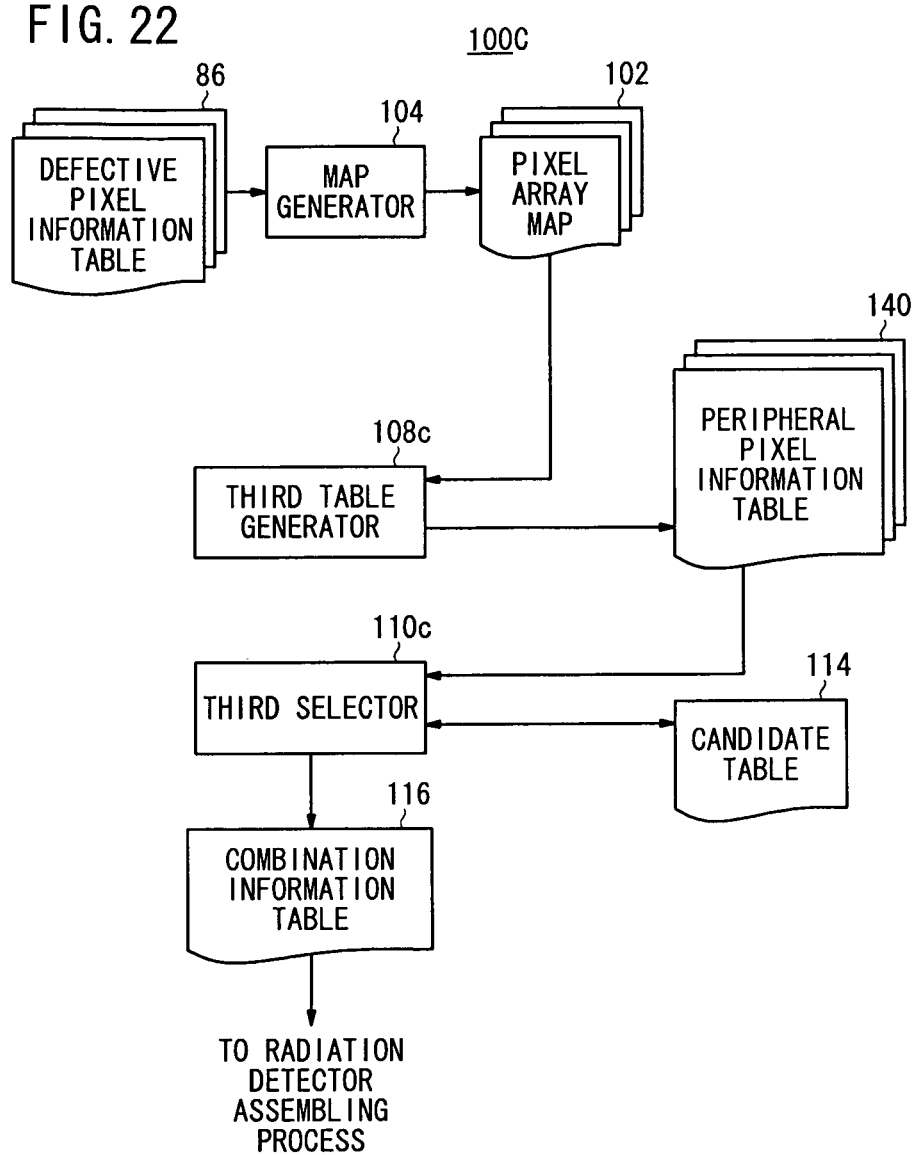
FIG. 22 is a block diagram of a third management system.

As shown in FIG. 22, the third management system 100C includes the map generator 104 described above, a third table generator 108c for generating a plurality of peripheral pixel information tables 140 corresponding to a plurality of manufactured radiation detectors 32, and each registering therein positional information of a defective pixel and peripheral pixels arrayed around and adjacent to the defective pixel along a row and a column, i.e., information of the rows and columns of bits corresponding to the defective pixel and peripheral pixels, and a third selector 110c for selecting, from among the manufactured radiation detectors 32, two radiation detectors such that a defective pixel of one of the radiation detectors is not included in a defective pixel and peripheral pixels therearound of the other radiation detector, and a defective pixel of the other radiation detector is not included in a defective pixel and peripheral pixels therearound of the one radiation detector when the two radiation detectors are stacked together, based on the generated peripheral pixel information tables 140.

The third managing method will be described below with reference to FIG. 23.

Figure 23:
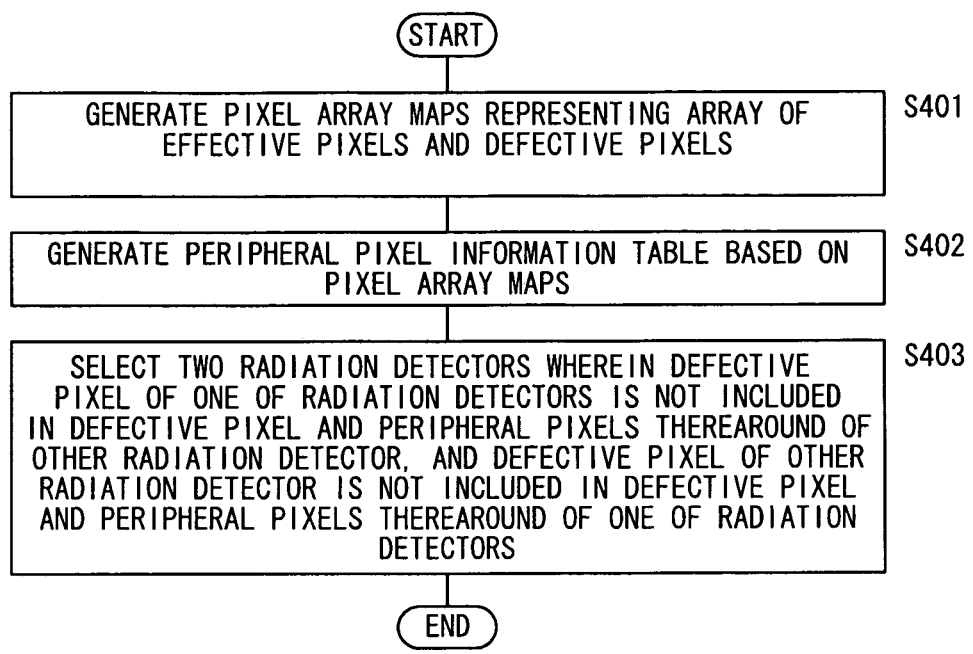
FIG. 23 is a flowchart of a third managing method.

In step S401 shown in FIG. 23, the map generator 104 of the third management system 100C generates pixel array maps 102 representing an array of effective pixels and defective pixels for respective radiation detectors 32, based on contents of the defective pixel information tables 86, which were generated when the radiation detectors 32 were manufactured, in the same manner as with step S1 described above.

In step S402, the third table generator 108c of the third management system 100C sets a defective pixel and peripheral pixels arrayed around and adjacent to the defective pixel along a row and a column, and registers positional information of the defective pixel and the peripheral pixels, i.e., information of the rows and columns of bits corresponding to the defective pixel and the peripheral pixels, in a peripheral pixel information table 140. The third table generator 108c performs the above process on all of the manufactured radiation detectors 32, thereby generating a plurality of peripheral pixel information tables 140. For example, if six radiation detectors 32 are manufactured, then the third table generator 108c generates six peripheral pixel information tables 140.

In step S403, the third selector 110c of the third management system 100C selects, from among the manufactured radiation detectors 32, two radiation detectors 32, wherein a defective pixel of one of the radiation detectors is not included in a defective pixel and peripheral pixels therearound of the other radiation detector, and a defective pixel of the other radiation detector is not included in a defective pixel and peripheral pixels therearound of the one radiation detector when the two radiation detectors are stacked together, based on the generated peripheral pixel information tables 140. More specifically, if six radiation detectors 32 are manufactured, then an nth radiation detector 32 is given as one of the six radiation detectors 32, and another radiation detector, which matches the nth radiation detector 32, is selected, so that at least one radiation detector 32 is extracted as a candidate. The ID of the extracted radiation detector 32 is registered in an nth record of the candidate table 114, as shown in FIG. 17. Based on an input action of the user and other calculations, an optimum combination of radiation detectors 32 is determined from the contents registered in the candidate table 114, and then the optimum combination is registered in a combination information table 116 (see FIG. 17). Combinations of two radiation detectors 32, i.e., combinations of IDs thereof, corrective unit regions 136 of which are not even partially superposed one on the other, are successively registered in the combination information table 116.

When a first radiation detector 32a and a second radiation detector 32b are subsequently stacked and assembled into an electronic cassette 18, the user refers to the combination of IDs of the two radiation detectors 32, which have been registered in the combination information table 116. Then, the user assembles the two radiation detectors 32, which have registered IDs as the first radiation detector 32a and the second radiation detector 32b, into the electronic cassette 18.

Thereafter, the radiographic image capturing system 10, which incorporates therein the electronic cassette 18, manages the first radiation detector 32a and the second radiation detector 32b, as with the first managing method. The first defective pixel information table 86a and the second defective pixel information table 86b, which correspond to the first radiation detector 32a and the second radiation detector 32b that are assembled in the electronic cassette 18, the first pixel array map 102a and the second pixel array map 102b, and a first peripheral pixel information table 140a and a second peripheral pixel information table 140b, are stored in the information memory 80 of the console 22. Furthermore, a first region information table 106a and a second region information table 106b are generated and stored in the information memory 80, as with the second management processor 120B, and such tables are updated when a new defective pixel is added.

Figure 24:
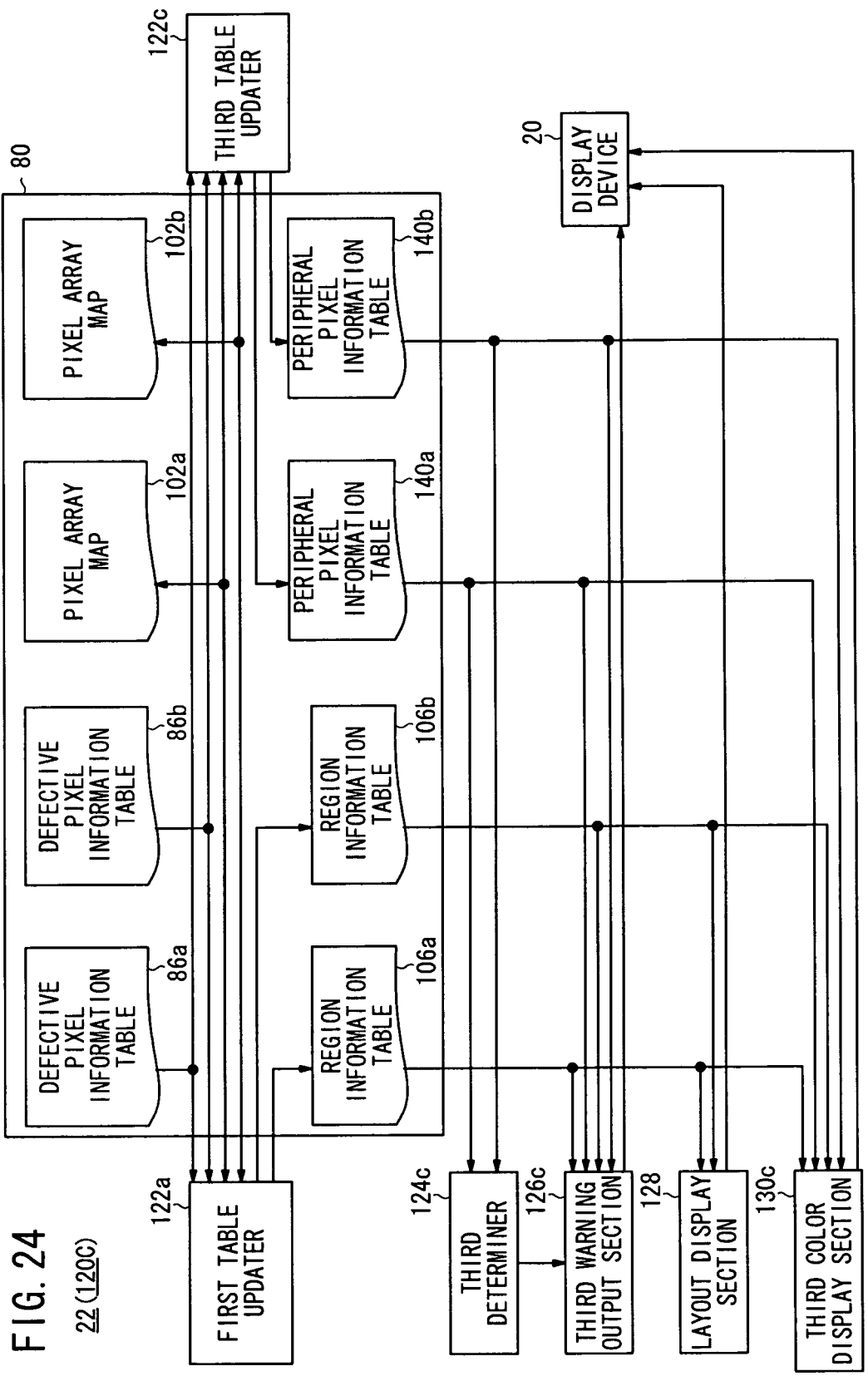
FIG. 24 is a block diagram of a third management processor of the console.

As shown in FIG. 24, the console 22 includes a third management processor 120C for managing the electronic cassette 18, which is incorporated in the radiographic image capturing system 10. As with the first management processor 120A, the third management processor 120C has a function to reflect positions of defective pixels that are newly discovered in a regular or irregular defective pixel detecting process carried out on the electronic cassette 18, including the first radiation detector 32a and the second radiation detector 32b, in various tables, in order to indicate deteriorated states of the first radiation detector 32a and the second radiation detector 32b.

The third management processor 120C includes a first table updater 122a, a third table updater 122c, a third determiner 124c, a third warning output section 126c, a layout display section 128, and a third color display section 130c.

The first table updater 122a is the same as the first table updater 122a described above with reference to FIG. 14, and will not be described in detail below. The third table updater 122c reflects positions of defective pixels, which are newly discovered in the defective pixel detecting process, in the first peripheral pixel information table 140a and the second peripheral pixel information table 140b. The third determiner 124c determines whether or not a defective pixel of one of two radiation detectors is included in a defective pixel and peripheral pixels thereof the other radiation detector, based on the first peripheral pixel information table 140a and the second peripheral pixel information table 140b. The third warning output section 126c issues a warning if the third determiner 124c discovers that a defective pixel of one of the two radiation detectors is included in a defective pixel and peripheral pixels thereabout of the other radiation detector.

The layout display section 128 models layouts of the first regions 112a and the second regions 112b of the first radiation detector 32a and the second radiation detector 32b, based on the first region information table 106a and the second region information table 106b, and displays the modeled layouts in a superposed relationship. The third color display section 130c displays regions where the first regions 112a are superposed one on the other and a defective pixel of one of the radiation detectors is included in a defective pixel and peripheral pixels thereabout of the other radiation detector in a first color, e.g., orange, displays regions where the first regions 112a are superposed one on the other and a defective pixel of one of the radiation detectors is not included in a defective pixel and peripheral pixels thereabout of the other radiation detector in a second color, e.g., yellow, displays regions where the first and second regions 112a, 112b are superposed one on the other in a third color, e.g., blue, and displays regions where the second regions 112b are superposed one on the other in a fourth color, e.g., white. In particular, the second color display section 130b displays regions where the first regions 112a are superposed one on the other and also defective pixels are superposed one on the other, in a different color, e.g., red.

Operation of the third management processor 120C will be described below with reference to FIG. 25.

The third management processor 120C performs the defective pixel detecting process referred to above. If a new defective pixel is discovered in the defective pixel detecting process, then the first table updater 122a adds (reflects) positional information of the new defective pixel to (in) the first defective pixel information table 86a and the second defective pixel information table 86b.

Figure 25:
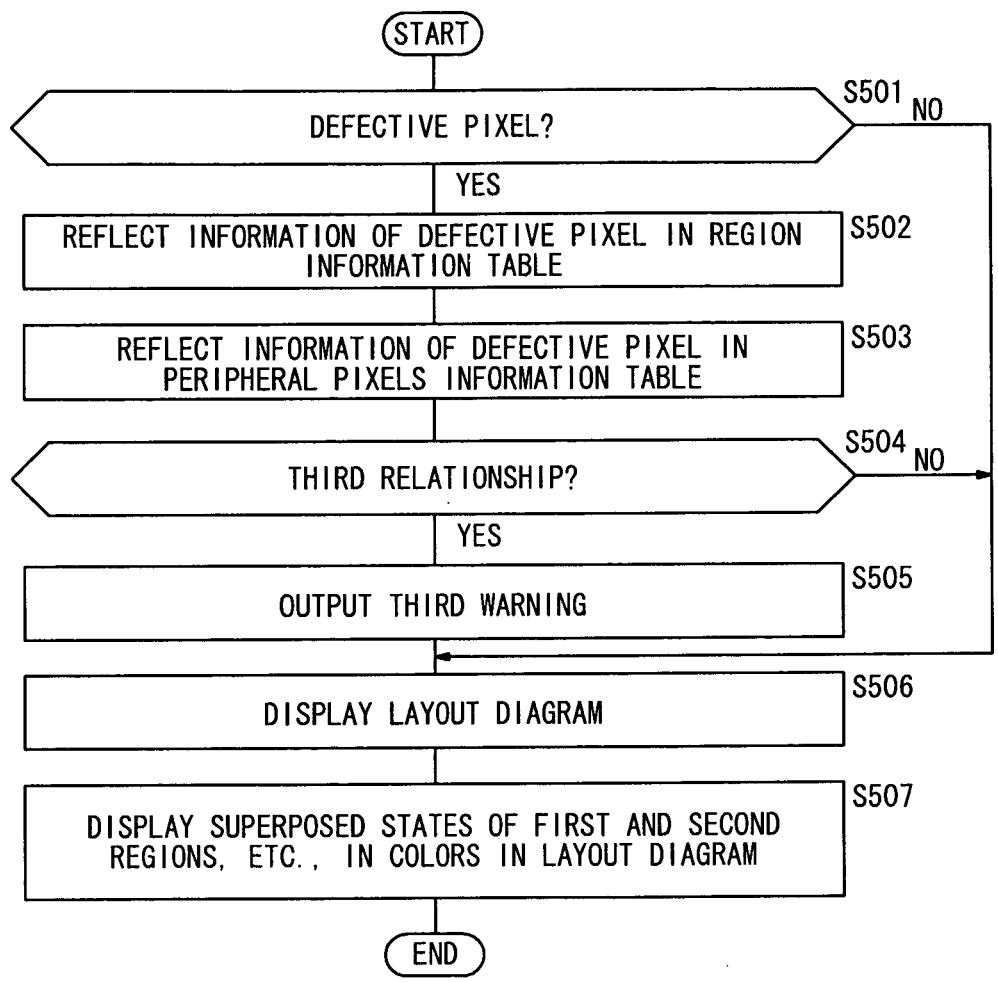
FIG. 25 is a flowchart of an operation sequence of the third management processor.

In step S501 shown in FIG. 25, the third management processor 120C determines whether or not there is a new defective pixel. If there is a new defective pixel, then control proceeds to step S502. In step S502, the first table updater 122a sets a bit, which corresponds to positional information of the new defective pixel in the first pixel array map 102a and the second pixel array map 102b, to "1", and reflects a first region 112a, which has correspondingly changed from a second region 112b, in the first region information table 106a and the second region information table 106b.

In step S503, the third table updater 122c registers (reflects) positional information of a defective pixel and peripheral pixels therearound, which correspond to the presently added defective pixel in the first corrective region information table 134a and the second corrective region information table 134b. For example, if a new defective pixel is discovered in the first radiation detector 32a, then the third table updater 122c reflects positional information of the new defective pixel in the first pixel array map 102a. When a corresponding second region 112b changes to a first region 112a in the first pixel array map 102a, the third table updater 122c reflects positional information of the new defective pixel in the first region information table 106a. Positional information of the new defective pixel and peripheral pixels therearound is reflected in the first peripheral pixel information table 140a. A similar sequence is carried out if a new defective pixel is found in the second radiation detector 32b.

In step S504, the third determiner 124c determines whether or not there is a region having a third relationship, i.e., a region where a defective pixel of one of the radiation detectors is included in a defective pixel and peripheral pixels therearound of the other radiation detector, when the first radiation detector 32a and the second radiation detector 32b are stacked one on the other, based on the first peripheral pixel information table 140a and the second peripheral pixel information table 140b.

If there is a region having the third relationship, then control proceeds to step S505, in which the third warning output section 126c displays the number of defective pixels in the region where the first regions 112a are superposed one on the other, the number of defective pixels in the region having the third relationship, and a third warning, i.e., a message indicative of the third relationship, on the display device 20. If necessary, the third warning output section 126c may also output the message as a voice message to a speaker. If there is a region where defective pixels are superposed one on the other, then the third warning output section 126c may also display the number of such defective pixels, along with a corresponding message on the display device 20, and may output such information from the speaker as well.

After step S505, or if there is not a region having the third relationship in step S504, or if no new defective pixel is found in step S501, then control proceeds to step S506. In step S506, as shown in FIG. 16, the layout display section 128 displays, on the display device 20, a layout diagram 132, which represents a superposition of a first layout diagram 132a that models the layout of the first regions 112a and the second regions 112b of the first radiation detector 32a based on the first region information table 106a, and a second layout diagram 132b that models the layout of the first regions 112a and the second regions 112b of the second radiation detector 32b based on the second region information table 106b.

In step S507, the third color display section 130c displays, in the layout diagram 132 displayed on the display device 20, regions where the first regions 112a are superposed one on the other, and a defective pixel of one of the radiation detectors is included in a defective pixel and peripheral pixels therearound of the other radiation detector, in a first color, e.g., orange, displays regions where the first regions 112a are superposed one on the other, and a defective pixel of one of the radiation detectors is not included in a defective pixel and peripheral pixels therearound of the other radiation detector, in a second color, e.g., yellow, displays regions where the first and second regions 112a, 112b are superposed one on the other in a third color, e.g., blue, and displays regions where the second regions 112b are superposed one on the other in a fourth color, e.g., white. In particular, the third color display section 130c displays regions where the first regions 112a are superposed one on the other and defective pixels are superposed one on the other, in a different color, e.g., red.

The operation sequence of steps S501 through S507 is carried out each time that the regular or irregular defective pixel detecting process is brought to an end.

Advantages of the method of managing the radiation detectors 32 according to the present embodiment:

The method of managing the radiation detectors 32 according to the present embodiment offers the following advantages.

When a plurality of radiation detectors 32 are assembled into an electronic cassette 18, the radiation detectors 32 can be assembled together such that defective pixels are not disposed in the same pixel position (coordinates). As a result, if one of two radiation detectors 32 has a defective pixel therein, then data from the defective pixel can be corrected based on the output signal from a pixel of the other radiation detector 32, which is in the same pixel position as the defective pixel.

Each of the radiation detectors 32 is logically divided into a plurality of regions, and the regions are classified into and managed as first regions 112a including defective pixels, and second regions 112b free of defective regions. In this manner, it is easy to extract at least two radiation detectors 32, which are capable of being combined with each other. Therefore, a process of assembling two of such radiation detectors 32 into an electronic cassette 18 is simplified, and the time required to assemble the radiation detectors 32 is shortened.

Data from defective pixels can reliably be corrected during a period from a time when the radiation detectors 32 are assembled into the electronic cassette 18 to a time at which defective pixels grow and become superposed, as the electronic cassette 18 is used over time.

When the number of defective pixels has increased as the electronic cassette 18 is used over time, a warning is issued depending on the layout of the defective pixels, thus informing the user of the need for performing maintenance on the radiation detectors 32, as well as the time to replace the radiation detectors 32.

Layouts of defective pixels of radiation detectors 32 that are used are modeled and displayed. When the number of defective pixels has increased as the electronic cassette 18 is used over time, regions of radiation detectors 32 are displayed in colors depending on the layouts of the defective pixels, thus allowing the user to recognize, at a glance deteriorated states of the radiation detectors 32.

Radiation detectors are managed in terms of corrective unit regions in order to correct data of defective pixels according to a highly accurate correcting process.

Defective pixels, which are produced in the radiation detectors 32 while the electronic cassette 18 is in use, are reflected in a management process upon maintenance. A warning can thus be issued depending on the position of a produced defective pixel, for thereby prompting the user to appropriately deal with the electronic cassette 18, e.g., to change the process of correcting data of defective pixels, or to replace the radiation detectors 32, etc.

Advantages of the electronic cassette 18 according to the present embodiment:

The electronic cassette 18 according to the present embodiment allows data of defective pixels to reliably be corrected during a period from the time when the radiation detectors 32 are assembled into the electronic cassette 18 to a time when defective pixels grow and become superposed as the electronic cassette 18 is used over time.

Advantages of the radiographic image capturing system 10:

The radiographic image capturing system 10 according to the present embodiment offers the following advantages.

When the number of defective pixels has increased as the electronic cassette 18 is used over time, a warning is issued depending on the layout of the defective pixels, in order to inform the user of a need for maintenance on the radiation detectors 32, as well as a time to replace the radiation detectors 32.

The layouts of defective pixels of the radiation detectors 32 used are modeled and displayed. When the number of defective pixels has increased as the electronic cassette 18 is used over time, regions of the radiation detectors 32 are displayed in colors depending on the layouts of defective pixels, thereby allowing the user to recognize at a glance deteriorated states of the radiation detectors 32.

The method of managing the radiation detectors 32, the electronic cassette 18, and the radiographic image capturing system 10, which includes at least two radiation detectors 32 according to the present embodiment, allow defective pixels to initially be present to a certain extent, so that an inexpensive mass-produced radiographic image capturing system can be constructed.

In the above embodiment, the principles of the present invention are applied to the electronic cassette 18, wherein two radiation detectors 32 are disposed in confronting relation to each other with the scintillator 30 interposed therebetween. However, the principles of the present invention also are applicable to an electronic cassette in which three or more radiation detectors 32 are disposed in confronting relation to each other, with the scintillator 30 interposed between any two adjacent radiation detectors 32.

Furthermore, an electronic cassette may include a plurality of stacked radiation detectors of a type that converts radiation directly into electric charges.

The radiation detector managing method, the radiographic image capturing apparatus, and the radiographic image capturing system according to the present invention are not limited to the above-described embodiments. It should be understood that various changes and modifications may be made to the embodiments without departing from the scope of the invention as set forth in the appended claims.

Figure 26:
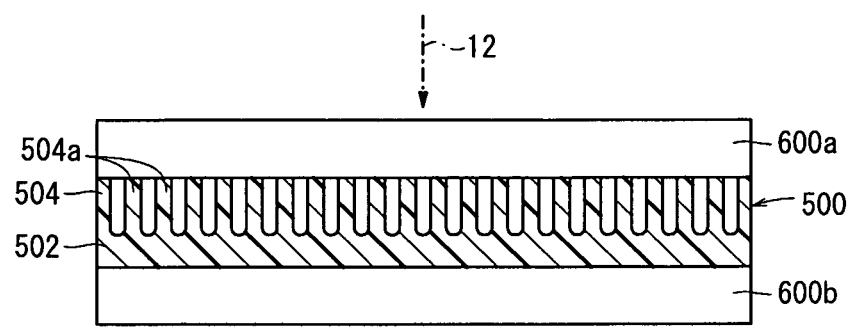
FIG. 26 is an explanatory drawing for explaining the structure of a scintillator according to a modified example.
Figure 27:
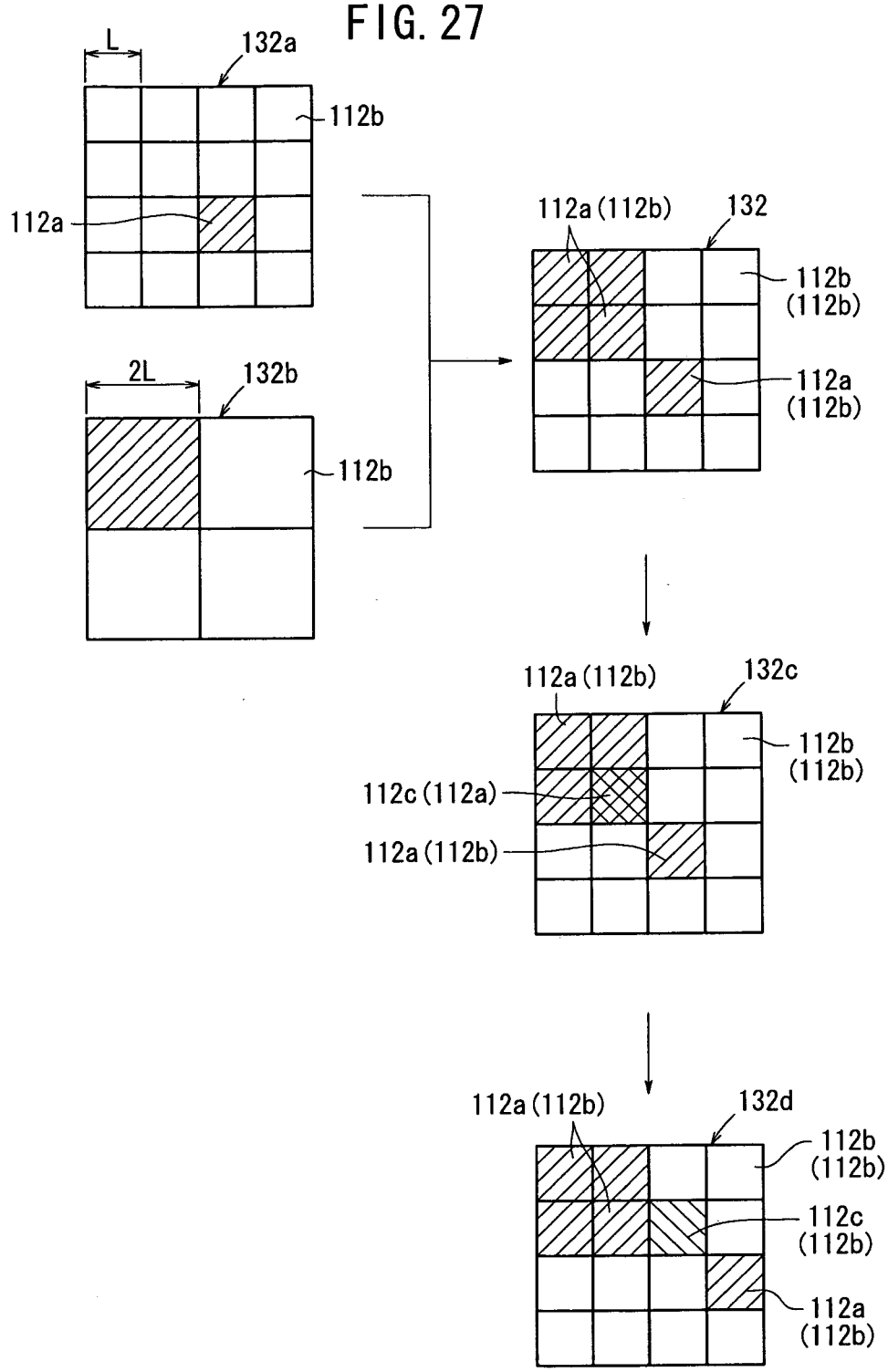
FIG. 27 is a diagram showing pixel positions of a first radiation detector according to the modified example and a second radiation detector according to the modified example.
Figure 28:
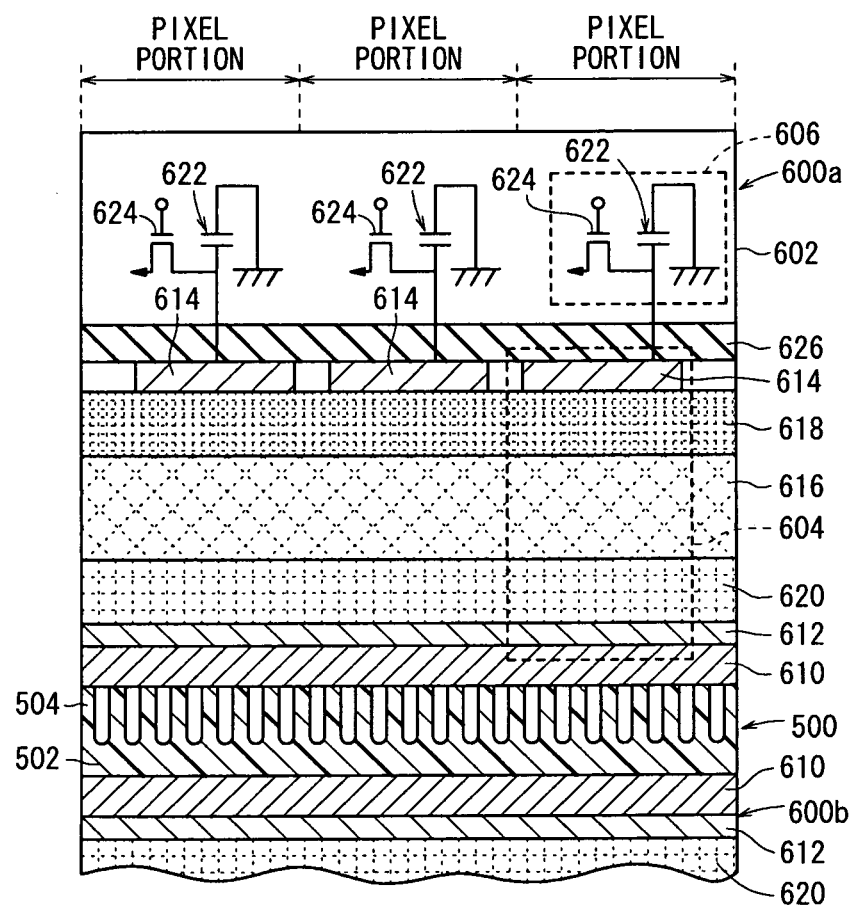
FIG. 28 is a cross sectional schematic view showing in outline the structure of three pixel portions of the first radiation detector according to the modified example, the scintillator, and a portion of the second radiation detector according to the modified example.
Figure 29:
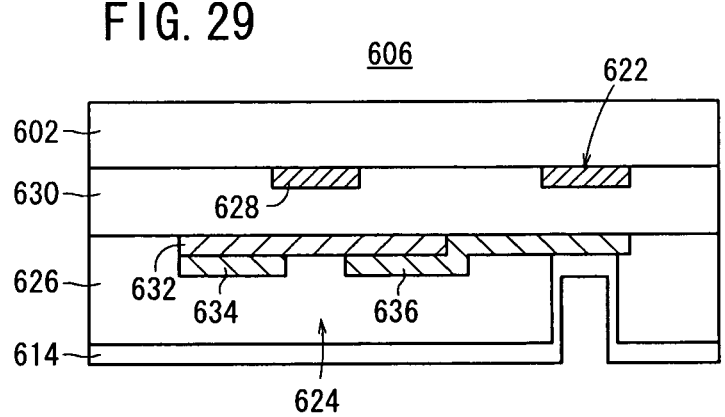
FIG. 29 is an outline schematic view of thin film transistors (TFTs) and electric charge storage elements shown in FIG. 28.

For example, the scintillator 30 may comprise the scintillator 500 according to the modified example shown in FIGS. 26 and 28, and the first radiation detector 32a and the second radiation detector 32b may be configured as a first radiation detector 600a and a second radiation detector 600b, according to the modified example shown in FIGS. 26 through 29. FIG. 26 is an explanatory drawing explaining the structure of the scintillator 500. FIG. 27 is a diagram showing pixel positions of a first radiation detector and a second radiation detector. FIG. 28 is a cross sectional schematic view showing in outline the structure of three pixel portions of the first radiation detector 600a according to the modified example, the scintillator 500, and a portion of the second radiation detector 600b according to the modified example. FIG. 29 is an outline schematic view of thin film transistors (TFTs) 624 and storage capacitors 622 shown in FIG. 28.

As shown in FIGS. 26 and 28, the scintillator 500 includes a non-columnar portion 502 having a non-columnar crystalline structure formed by direct vapor deposition of CsI(Tl) under predetermined conditions with respect to the second radiation detector 600b using a vacuum vapor deposition method, and a columnar portion 504 having a columnar crystalline structure formed by vapor depositing CsI(Tl) with respect to the non-columnar portion 502 using a vacuum vapor deposition method under conditions that differ from the aforementioned predetermined conditions.

The non-columnar portion 502 is positioned so as to cover all of the pixels of the second radiation detector 600b from the side that is irradiated with radiation 12. The columnar portion 504 is positioned over roughly the entire surface of one side of the non-columnar portion 502 (i.e., on a surface of a side where the first radiation detector 600a is positioned). Consequently, light that is generated from the scintillator 500 can be guided reliably to all of the pixels of the first radiation detector 600a, and to all of the pixels of the second radiation detector 600b.

Each of the strip-like columns 504a that make up the columnar portion 504 extends along the height direction of the casing 28 (i.e., in the thickness direction of the first radiation detector 600a), with gaps being secured between adjacent columns 504a. In FIG. 26, to facilitate description, the gaps between the adjacent columns 504a are depicted in an exaggerated form.

An end surface of each of the columns 504a of the columnar portion 504 is joined (connected) optically with respect to the first radiation detector 600a. More specifically, by retaining the scintillator 500 in a condition such that the end surface of each of the columns 504a is pressed against the first radiation detector 600a, gaps between the end surface of each of the columns 504a and the first radiation detector 600a are made as small as possible. Consequently, since air gaps between the end surface of each of the columns 504a and the first radiation detector 600a can be kept as small as possible, losses in light, which are generated from the scintillator 500 and directed to the first radiation detector 600a, can be suppressed.

As methods for retaining the scintillator 500, for example, there may be used a method of urging the scintillator 500 (or the first radiation detector 600a) using a spring or the like toward a side of the first radiation detector 600a (or toward a side of the scintillator 500), or a method of fastening the first radiation detector 600a and the second radiation detector 600b using a clamp or the like in a direction to mutually approach one another. In this case, as shall be described later, the first radiation detector 600a may include a photoelectric conversion film 616 that is constructed to include an organic photoconductor, and a signal output unit 606 that is constructed to include an organic semiconductor material. Owing thereto, because the first radiation detector 600a can be made flexible (i.e., the first radiation detector 600a possesses flexibility), the scintillator 500 can easily be placed in close contact with respect to the first radiation detector 600a, and the amount of radiation (X-rays) 12 absorbed by the first radiation detector 600a can be kept small.

In this manner, in the event that the scintillator 500 is pressed into abutment against the first radiation detector 600a, for example, by shifting the mutual positioning of the first radiation detector 600a and the second radiation detector 600b in a state of being lightly pressed into abutment against each other, the positional relationship between pixels of the first radiation detector 600a and pixels of the second radiation detector 600b can be changed.

Owing thereto, in the case that defective pixels are newly discovered in the defective pixel detection process in the first managing method, and it is determined by the first determiner 124a that a relationship exists in which the first regions 112a (defective pixels) are superposed on each other, the relative positioning of the first radiation detector 600a and the second radiation detector 600b can be shifted, such that the first regions 112a are no longer superposed on each other.

Further, for example, in the case it is determined by the second determiner 124b in the second managing method that the corrective unit regions 136 are even partially superposed one on the other, the relative positioning of the first radiation detector 600a and the second radiation detector 600b can be shifted, such that the corrective unit regions 136 are no longer superposed on each other.

Furthermore, for example, in the case that it is determined by the third determiner 124c in the third managing method that a relationship exists in which one of the defective pixels is included in another defective pixel and peripheral pixels therearound, the relative positioning of the first radiation detector 600a and the second radiation detector 600b can be shifted, such that one of the defective pixels no longer is included in the other defective pixel and peripheral pixels therearound. As a result of shifting the relative positioning of the first radiation detector 600a and the second radiation detector 600b based on the first through third managing methods, in the case that the region of the radiographic image in which image capturing is possible is reduced by a predetermined amount (e.g., 5%) or greater, each of the warning output sections 126a through 126c may generate warnings, which indicate that it is necessary to exchange the first radiation detector 600a and/or the second radiation detector 600b.

Further, it is possible for the first radiation detector 600a and the second radiation detector 600b to be structured so that respective pixels thereof are of different sizes. For example, as shown in FIG. 27, the pixel size of the first radiation detector 600a can be set to 25% the size of the pixels of the second radiation detector 600b. In FIG. 27, a first layout diagram of the first radiation detector 600a is shown by reference numeral 132a, a second layout diagram of the second radiation detector 600b is shown by reference numeral 132b, an layout diagram in which the aforementioned relationship diagrams are combined is shown by reference numeral 132, an layout diagram of a state in which a defective pixel 112c is newly discovered after manufacturing of the electronic cassette 18 is shown by reference number 132c, and an layout diagram, indicative of a state in which the relative positioning of the first radiation detector 600a and the second radiation detector 600b as shown in the layout diagram 132c is shifted, is shown by reference numeral 132d. For purposes of convenience, the number of pixels of the layout diagrams shown in FIG. 27 is less than actually used in practice.

In addition, in the case that a defective pixel 112c is newly discovered by the first radiation detector 600a in a defective pixel detection process in the first managing method, and it is determined by the first determiner 124a that a relationship has occurred in which that defective pixel 112c and a defective pixel 112a of the second radiation detector 600b are partially superposed one on the other (refer to the layout diagram 132c), for example, by shifting the relative positions of the first radiation detector 600a and the second radiation detector 600b by 1 pixel (distance L) of the first radiation detector 600a, the defective pixel 112c of the first radiation detector 600a and the defective pixel 112a of the second radiation detector 600b can be arranged so as not to be superposed. More specifically, in the layout diagram 132c, by moving the first radiation detector 600a with respect to the second radiation detector 600*b* by a distance L toward the right side (or the downward side) of FIG. 27, the defective pixel 112*a* and the defective pixel 112*c* can be arranged so as not to be superposed on each other.

Consequently, compared to a case in which the pixel size of the first radiation detector 600*a* and the pixel size of the second radiation detector 600*b* are set the same, the amount by which the first radiation detector 600*a* is shifted can be reduced (by one half in the case of FIG. 27). Thus, the reduction amount by which the image capturing capable region of the radiographic image is reduced can be suppressed.

In FIG. 27, although an example has been shown in which the first radiation detector 600*a* has a smaller pixel size (higher resolution), the relationship thereof may be reversed. However, because more light emitted from the scintillator 500 is directed to the first radiation detector 600*a* than to the second radiation detector 600*b*, it is preferable for the pixel size of the first radiation detector 600*a* to be smaller.

In this manner, in the case that the image capturing capable region of the radiographic image is reduced by a predetermined amount or greater, the first radiation detector 600*a* and/or the second radiation detector 600*b* can be exchanged, and in other cases apart therefrom, because the relative positioning of the first radiation detector 600*a* and the second radiation detector 600*b* can be shifted, the electronic cassette 18 can be maintained in a state of high quality at low cost.

The joining method between the first radiation detector 600*a* and an end surface of each of the columns 504*a* of the columnar portion 504 that make of the scintillator 500 is not limited to a method of pressing into abutment. For example, a method by means of adhesion using an adhesive, or a method using a matching oil made of a gel or the like may be used. Further, a moisture barrier constituted by a resin or the like may be disposed on the end surface of the columns 504*a*. In this case, CsI(Tl), which is a deliquescent, can be protected against moisture.

The wavelength of visible light emitted by the scintillator preferably is in a visible light region of 360 nm to 830 nm. In order to enable monochrome images from the first radiation detector 600*a* and the second radiation detector 600*b*, a wavelength region including green therein particularly is preferred. With CsI(Tl) in particular, the emission spectrum thereof during application of radiation 12 is within 420 nm to 700 nm, and together therewith, the luminescence peak wavelength is 565 nm.

In the case that GOS is used as the scintillator 500, GOS is coated onto a resin base, and thereafter, the scintillator is pasted onto the surface of a TFT active matrix substrate. Owing thereto, even if coating of the GOS is unsuccessful, the TFT active matrix substrate can still be preserved.

Next, with reference to FIGS. 28 and 29, the structure of the first radiation detector 600*a* shall be explained. Concerning the second radiation detector 600*b*, because the structure thereof is simply vertically (i.e., y-axis) reversed with respect to the first radiation detector 600*a*, detailed description thereof will be omitted.

As shown in FIG. 28, the first radiation detector 600*a* includes a sensor unit 604 that absorbs light emitted from the scintillator 500 and generates electrical charges corresponding to such light, and a signal output unit 606 disposed on an insulative substrate 602, for converting the electrical charges generated by the sensor unit 604 into electrical signals and outputting the same, such that one pixel is made up from the sensor unit 604 and the signal output unit 606. The pixels are arrayed in rows and columns on the substrate 602. The signal output unit 606 and the sensor unit 604 at each of the pixels are constructed in a superposed fashion.

The sensor unit 604 includes a first electrode 612, a second electrode 614, and a photoelectric conversion film 616 arranged between the first electrode 612 and the second electrode 614.

Because it is necessary for light generated by the scintillator 500 to be incident on the photoelectric conversion film 616, preferably, the first electrode 612 is constituted by a conductive material, which is transparent at least with respect to the light emission wavelength of the scintillator 500, and more specifically, a transparent conductive oxide (TCO) having a low resistivity and high transparency with respect to visible light is used. Further, although a metallic thin film of Au or the like may be used as the first electrode 612, since when the transparency is 90% or greater the resistance thereof easily increases, TCO is preferred over such a metallic thin film. For example, ITO, IZO, AZO, FTO, $SnO_2$, $TiO_2$, $ZnO_2$ or the like preferably can be used, among which, from the standpoints of ease of processing, low resistivity, and transparency, ITO is most preferred. The first electrode 612 may comprise a single sheet-like structure, which is used in common with all of the pixels, or the first electrode 612 may be divided into respective units for each pixel.

The photoelectric conversion film 616 includes an organic photoconductor (OPC) therein, which absorbs light generated from the scintillator 500 and generates electrical charges corresponding to the light absorbed thereby. Assuming the photoelectric conversion film 616 includes such an organic photoconductor (organic photoelectric conversion material), then a sharp absorption spectrum in the visible light region is possessed thereby, and noise, which is generated by absorption of radiation 12 by the photoelectric conversion film 616, can effectively be suppressed, substantially without electromagnetic waves outside of the light generated by the scintillator 500 being absorbed by the photoelectric conversion film 616. The photoelectric conversion film 616 may be constituted so as to include amorphous silicon in place of an organic photoconductor. In this case, a wide absorption spectrum is possessed thereby, and emitted light from the scintillator 500 can be absorbed effectively.

In order that the organic photoconductor constituting the photoelectric conversion film 616 absorbs light emitted by the scintillator 500 with highest efficiency, the peak wavelength thereof preferably is as close as possible to the light emission peak wavelength of the scintillator 500. Ideally, the absorption peak wavelength of the organic photoconductor and the light emission peak wavelength of the scintillator 500 are the same, however, so long as the difference therebetween is kept small, the light emitted by the scintillator 500 can be absorbed sufficiently. More specifically, the difference between the absorption peak wavelength of the organic photoconductor and the emission peak wavelength of the scintillator 500 preferably is within 10 nm or less, and more preferably, within 5 nm or less.

As organic photoconductors capable of satisfying the aforementioned conditions, for example, a quinacridone system organic compound and a phthalocyanine system organic compound can be cited. For example, because the absorption peak wavelength in the visible light range of quinacridone is 560 nm, if quinacridone is used as the organic photoconductor and CsI(Tl) is used as the material for the scintillator 500, then the aforementioned difference in peak wavelengths can be kept to within 5 nm or less, and the electrical charge amount generated by the photoelectric conversion film 616 can be made substantially maximum.

The sensor unit 604 is constituted so as to include an organic layer formed by stacking or mixing an electromagnetic absorptive region, a photoelectric conversion region, an electronic transport region, a positive hole transport region, an electron blocking region, a positive hole blocking region, a crystallization preventive region, electrodes, and an interlayer contact enhancing region or the like. The organic layer preferably incorporates therein an organic p-type compound (organic p-type semiconductor) or an organic n-type compound (organic n-type semiconductor).

Such a p-type organic semiconductor is an organic semiconductor donor (compound) represented principally by a positive hole-transporting organic compound, defined by an organic compound having a character known to easily donate electrons, and more specifically, by an organic compound having a small ionization potential when two organic materials are used in contact with one another. Accordingly, as the donor organic compound, there can be used any type of organic compound, so long as it is an electron-donating type of organic compound.

The n-type organic semiconductor is an organic semiconductor acceptor (compound) represented principally by an electron-transporting organic compound, defined by an organic compound having a character known to easily receive electrons, and more specifically, by an organic compound having a large electron affinity when two organic materials are used in contact with one another. Accordingly, as the acceptor organic compound, there can be used any type of organic compound, so long as it is an electron-receiving type of organic compound.

Concerning materials applicable for use as the organic p-type semiconductor and the organic n-type semiconductor, as well as the structure of the photoelectric conversion film 616, because details thereof are described fully in Japanese Laid-Open Patent Publication No. 2009-032854, the disclosure of which is incorporated herein by reference, explanations thereof will be omitted in the present specification. Further, the photoelectric conversion film 616 may be formed so as to contain therein a fullerene or carbon nanotube structure.

Concerning the thickness of the photoelectric conversion film 616, the film thickness thereof preferably should be large from the standpoint of absorption of light from the scintillator 500. However, because when the thickness exceeds a certain degree, the electric field intensity generated in the photoelectric conversion film 616 in accordance with a bias potential applied from opposite ends of the photoelectric conversion film 616 tends to decrease, rendering the collection of electric charges impossible, preferably the thickness of the photoelectric conversion film 616 should reside between 30 nm or greater and 300 nm or less, more preferably, between 50 nm or greater and 250 nm or less, and still more preferably, between 80 nm or greater and 200 nm or less.

The photoelectric conversion film 616 may comprise a single sheet-like structure, which is used in common with all of the pixels, or the photoelectric conversion film 616 may be divided into respective units for each pixel. The second electrode 614 is defined by a divided membrane, respective portions of which are provided for each of the pixels. However, the second electrode 614 may also be a single sheet-like structure, which is used in common with all of the pixels. The second electrode 614 can be made up from an aluminum material that is transmissive to radiation (X-rays) 12. The thickness of the second electrode 614, for example, can be set between 30 nm or greater and 300 nm or less.

With the sensor unit 604, by applying a predetermined bias voltage between the first electrode 612 and the second electrode 614, from among the electric charge types (positive holes, electrons) generated by the photoelectric conversion film 616, one type of such electric charges can be made to travel to the first electrode 612, whereas the other type can be made to travel to the second electrode 614. With the first radiation detector 600a according to the modified example, wiring is connected to the first electrodes, and a bias voltage is applied to the first electrode 612 through such wiring. Further, although the polarity of the bias voltage is determined such that electrons generated in the photoelectric conversion film 616 travel to the first electrode whereas positive holes travel to the second electrode 614, the polarity thereof may be reversed.

The sensor unit 604 constituting the respective pixels may include at least the second electrode 614, the photoelectric conversion film 616 and the first electrode 612. However, in order to suppress an increase in dark current, preferably, at least one or both of an electron blocking film 618 and a positive hole blocking layer 620 is provided.

The electron blocking film 618 can be disposed between the second electrode 614 and the photoelectric conversion film 616, such that when a bias voltage is applied between the second electrode 614 and the first electrode 612, electrons from the second electrode 614 infuse into the photoelectric conversion film 616, whereby an increase in dark current can be suppressed.

An electron donor organic material can be used for the electron blocking film 618. In actuality, the material used for the electron blocking film 618 should be selected for compatibility with the adjacent electrode material and the adjacent photoelectric conversion film material, and preferably has an electron affinity (Ea) of 1.3 eV or greater from the work function (Wf) of the material of the adjacent electrode, and an ionization potential Ip, which is equal to or less than the ionization potential (Ip) of the adjacent photoelectric conversion film 616. Concerning materials that are applicable for use as the electron donor organic material, because details thereof are described fully in Japanese Laid-Open Patent Publication No. 2009-032854, the disclosure of which is incorporated herein by reference, descriptions of such materials will be omitted in the present specification.

The thickness of the electron blocking film 618 is preferably in a range of 10 nm or greater to 200 nm or less, more preferably 30 nm or greater to 150 nm or less, and particularly preferably, 50 nm or greater to 100 nm or less, for the purpose of reliably bringing about the dark current suppression effect, and for preventing lowering of the photoelectric conversion effectiveness of the sensor unit 604.

The positive hole blocking film 620 can be disposed between the photoelectric conversion film 616 and the first electrode 612, such that when a bias voltage is applied between the second electrode 614 and the first electrode 612, positive holes from the first electrode 612 infuse into the photoelectric conversion film 616, whereby an increase in dark current can be suppressed.

An electron receptive organic material can be used for the positive hole blocking film 620. The thickness of the positive hole blocking film 620 is preferably in a range of 10 nm or greater to 200 nm or less, more preferably 30 nm or greater to 150 nm or less, and particularly preferably, 50 nm or greater to 100 nm or less, for the purpose of reliably bringing about the dark current suppression effect, and for preventing lowering of the photoelectric conversion effectiveness of the sensor unit 604.

In actuality, the material used for the positive hole blocking film 620 should be selected for compatibility with the adjacent electrode material and the material of the adjacent photoelectric conversion film 616, and preferably has a large ionization potential (Ip) of 1.3 eV or greater from the work function (Wf) of the material of the adjacent electrode, and an electron affinity Ea that is equal to or greater than the electron affinity (Ea) of the material of the adjacent photoelectric conversion film 616. Concerning materials that are applicable for use as the electron receptive organic material, because details thereof are described fully in Japanese Laid-Open Patent Publication No. 2009-032854, the disclosure of which is incorporated herein by reference, descriptions of such materials will be omitted in the present specification.

Among the electric charges generated by the photoelectric conversion film 616, in the case that the bias voltage is set such that positive holes travel toward the first electrode 612 and electrons travel toward the second electrode 614, the positions of the electron blocking film 618 and the positive hole blocking film 620 may be reversed. Further, it is acceptable if both the electron blocking film 618 and the positive hole blocking film 620 are not provided, and if either one thereof is provided, the dark current suppression effect can still be attained to a certain extent.

As shown in FIG. 29, the signal output unit 606 is provided on the surface of the substrate 602 so as to correspond to the second electrode 614 of each pixel unit. The signal output unit 606 has a storage capacitor 622 that stores the charges that have traveled to the second electrode 614, and a TFT 624 that converts the charges stored in the storage capacitor 622 into electric signals and outputs the electric signals. A region in which the storage capacitor 622 and the TFT 624 are formed has a portion that overlaps the second electrode 614 in plan view. In this way, the signal output unit 606 and the sensor unit 604 in each pixel unit overlap each other in the thickness direction. It is possible to minimize the planar area of the first radiation detector 600a (pixel unit), when the signal output unit 606 is formed such that the storage capacitor 622 and the TFT 624 are completely covered by the second electrode 614.

The storage capacitor 622 is electrically connected to the corresponding second electrode 614 through a conductive line that is formed so as to pass through an insulating film 626 provided between the substrate 602 and the second electrode 614. In this way, it is possible for charges captured by the second electrode 614 to be moved to the storage capacitor 622.

The TFTs 624 are formed by laminating a gate electrode 628, a gate insulating film 630, and an active layer (channel layer) 632, and providing a source electrode 634 and a drain electrode 636 on the active layer 632 with a predetermined gap therebetween. The active layer 632 may be made of, for example, amorphous silicon, an amorphous oxide, an organic semiconductor material, or carbon nanotubes. The material that forms the active layer 632 is not limited to the aforementioned materials.

An oxide (for example, an In—O-based oxide) including at least one of In, Ga, and Zn is preferably used as the amorphous oxide that can form the active layer 632. More preferably, an oxide (for example, an In—Zn—O-based oxide, an In—Ga—O-based oxide, or a Ga—Zn—O-based oxide) including at least two of In, Ga, and Zn is used as the amorphous oxide. Most preferably, an oxide including In, Ga, and Zn is used as the amorphous oxide. As an In—Ga—Zn—O-based amorphous oxide, an amorphous oxide having a composition represented by $InGaO_3(ZnO)_m$ (where m is a natural number smaller than 6) in a crystalline state is preferable, and $InGaZnO_4$ is more preferable. The amorphous oxide that can form the active layer 632 is not limited to the aforementioned materials.

A phthalocyanine compound, pentacene, or vanadyl phthalocyanine may be given as examples of the organic semiconductor material that can form the active layer 632, however, the organic semiconductor material is not limited thereto. The structure of the phthalocyanine compound has been described in detail in Japanese Laid-Open Patent Publication No. 2009-212389, the disclosure of which is incorporated herein by reference, and thus a detailed description of the phthalocyanine compound will be omitted in the present specification.

If the active layer 632 of the TFTs 624 is made of an amorphous oxide, an organic semiconductor material, or carbon nanotubes, radiation 12 (such as X-rays) is not absorbed thereby. Even if such radiation 12 is absorbed, the absorbed amount will be very small. Therefore, it is possible to effectively prevent generation of noise in the signal output unit 606.

In the case that the active layer 632 is made of carbon nanotubes, it is possible to improve the switching speed of the TFTs 624, as well as to form the TFTs 624 with low light absorptance in the visible light range. In addition, in the case that the active layer 632 is made of carbon nanotubes, even though very small amounts of metallic impurities are mixed with the active layer 632, because the performance of the TFTs 624 is significantly reduced thereby, it is necessary to separate and extract carbon nanotubes with very high purity using, for example, a centrifugal separation method, and to form the active layer 632 with such carbon nanotubes.

Any one of amorphous oxide, an organic semiconductor material, carbon nanotubes, and an organic photoconductor can be used to form a film at low temperature. Thus, the substrate 602 is not limited to a substrate having high heat resistance, such as a semiconductor substrate, a quartz substrate, or a glass substrate. Alternatively, a flexible substrate, such as a plastic substrate, an aramid substrate, or a bionanofiber substrate, may be used as the substrate 602. More specifically, for example, a flexible substrate made of the following materials, i.e., polyester, such as polyethylene terephthalate, polybutylene phthalate, or polyethylene naphthalate, polystyrene, polycarbonate, polyether sulfone, polyarylate, polyimide, polycycloolefin, norbornene resin, and polychlorotrifluoroethylene, may be used. When such a flexible substrate made of plastic is used, it is possible to reduce the weight of the substrate. Such a structure has advantages in terms of portability, for example.

When the photoelectric conversion film 616 is formed of an organic photoconductor and the TFTs 624 are formed of an organic semiconductor material, it is possible to form films of the photoelectric conversion film 616 and the TFTs 624 at a low temperature with respect to a flexible substrate (substrate 602) made of plastic by means of the ink-jet printing. Owing thereto, because film forming precision can be improved, it is difficult for pixel defects to be generated in the first radiation detector 600a. Consequently, the production yield of the first radiation detectors 600a can be improved.

The photoelectric conversion film 616 formed by an organic photoconductor and the TFTs 624 formed by an organic semiconductor material possess sufficient flexibility. Owing thereto, because damage to the first radiation detector 600a can be suppressed even in the case that a heavy or overweight subject 14 uses the first radiation detector 600a, the first radiation detector 600a overall can have a thin profile and be made lightweight. The effects attributable to the first radiation detector 600a also can be obtained by the second radiation detector 600b.

In addition, for example, an insulating layer for ensuring an insulating property, a gas barrier layer for preventing penetration of water or oxygen, and an undercoat layer for improving flatness or for improving adhesion of the electrodes or the like may be provided on the substrate 602.

Since aramid can be applied to high-temperature processes of 200 degrees or more, a transparent electrode material can be cured at a high temperature so as to possess low resistance. Further, aramid can respond to automatic mounting of a driver IC, including a solder reflow process. In addition, because the thermal expansion coefficient of aramid is close to that of ITO (indium tin oxide) or a glass substrate, after an aramid substrate has been manufactured, warping of the aramid substrate is small, and the aramid substrate is less likely to become cracked. Further, aramid enables a substrate to be formed, which is thinner, for example, than a glass substrate. Aramid may also be laminated onto an ultra-thin glass substrate in order to form the substrate 602.

The bio-nanofiber is a composite material made up of a cellulose microfibril bundle (bacterial cellulose) generated by bacteria (Acetobacter, Acetobacter Xylinum) and a transparent resin. The cellulose microfibril bundle has a width of 50 nm, a size equivalent to one-tenth of the visible light wavelength, high strength, high elasticity, and a low thermal expansion coefficient. A transparent resin, such as an acrylic resin or an epoxy resin, is impregnated into bacterial cellulose and then is cured to obtain a bio-nanofiber having a light transmittance of about 90% at a wavelength of 500 nm, while including 60% to 70% fiber. The bio-nanofiber has a low thermal expansion coefficient (3 to 7 ppm) equal to that of a silicon crystal, a strength (460 MPa) similar to that of steel, high elasticity (30 GPa), and is flexible. Therefore, the bio-nanofiber is capable of forming a substrate 602 having a thickness thinner than that of a glass substrate, for example.

In the first radiation detector 600a according to the modified example, since the photoelectric conversion film 616 is made of an organic photoconductor, and the active layer 632 of the TFTs 624 is made of an organic semiconductor material, radiation 12 is almost entirely non-absorbed by the photoelectric conversion film 616 and the signal output unit 606. Therefore, it is possible to prevent a reduction in sensitivity with respect to the radiation 12.

Both the organic semiconductor material forming the active layer 632 of the TFTs 624 and the organic photoconductor that forms the photoelectric conversion film 616 can be used to form films at low temperature. Therefore, the substrate 602 can be made of a plastic resin, aramid, or bio-nanofiber that absorbs only a small amount of radiation 12. Accordingly, it is possible to prevent reduction in sensitivity with respect to the radiation 12.

For example, in the case that the first radiation detector 600a is arranged inside the casing 28, and the substrate 602 is made of a plastic resin with high rigidity, aramid, or a bio-nanofiber, since the first radiation detector 600a inherently possesses high rigidity, it is possible to reduce the thickness of the casing 28. In addition, in the case that the substrate 602 is made of a plastic resin, aramid, or a bio-nanofiber having high rigidity, because the first radiation detector 600a inherently possesses flexibility, even when impacts are applied to the casing 28, owing to the flexibility thereof, the first radiation detector 600a is less likely to become damaged.

With the electronic cassette 18 according to the present modified example, in at least the first radiation detector 600a, preferably, the photoelectric conversion film 616 is formed from an organic photoconductor, while the TFTs 624 are formed using an organic semiconductor material. Therefore, in this case, the amount of radiation (X-rays) absorbed by the first radiation detector 600a can be suppressed.

Figure 30:
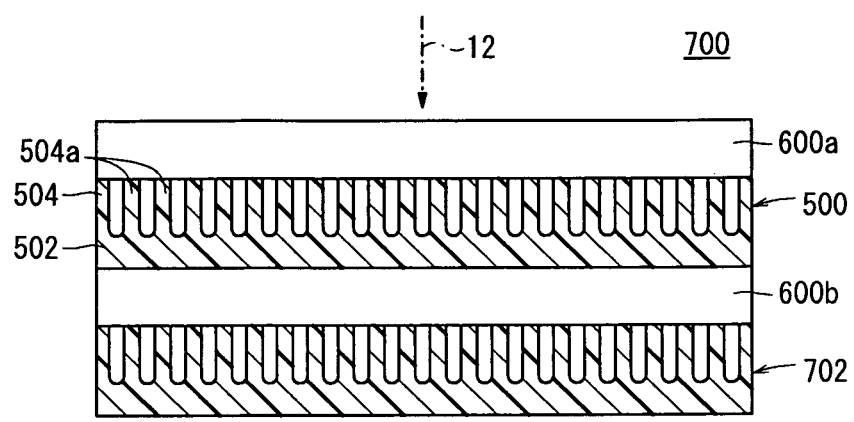
FIG. 30 is a view showing a modified example of an electronic cassette with partial omission.

The electronic cassette used in the present invention may be an electronic cassette 700 having a structure shown in FIG. 30 instead of the structure shown in FIG. 26. In this modified example, structural elements identical with those shown in FIG. 26 are assigned by the same reference numerals, and detailed explanation thereof will be omitted.

As shown in FIG. 30, the structure of the electronic cassette 700 according to the present modified example is different from that shown in FIG. 26 in a second scintillator 702 disposed on the rear surface of the second radiation detector 600b in the electronic cassette 700.

That is, the columnar portion 504 of the scintillator 500 is formed by vapor deposition on the first radiation detector 600a, while the non-columnar portion 502 of the scintillator 500 is optically jointed with respect to the second radiation detector 600b.

The scintillator 702 has a non-columnar crystalline structure formed by direct vapor deposition of CsI(Tl) under predetermined conditions with respect to substantially the entire rear surface of second radiation detector 600b using a vacuum vapor deposition method.

The scintillator 500 is retained by pressing the rear surface of the non-columnar portion 502 thereof against the second radiation detector 600b. Thus, gaps between the non-columnar portion 502 and the second radiation detector 600b are made as small as possible. Consequently, since air gaps between the non-columnar portion 502 and the second radiation detector 600b can be kept as small as possible, losses, due to the air gaps, in light, which are generated from the scintillator 500 and directed to the second radiation detector 600b, can be suppressed.

In a case where a defect develops at a part of the scintillator in an electronic cassette, which has one radiation detector and only on one surface of which is equipped with a scintillator, the defected portion may not be able to convert radiation into light. That is, the scintillator may not be able to emit light to a part of pixels of the radiation detector, and thus the acquired radiation image may result in defective.

However, the electronic cassette 700 according to the present modified example includes the scintillator 500 on one surface of the second radiation detector 600b and the scintillator 702 on the other (rear) surface of the second radiation detector 600b. Thus, even if a defect develops at a part of the scintillator 500 and the scintillator 500 fails to emit light to the pixels of the first radiation detector 600a and the second radiation detector 600b at a position corresponding to the defect, the pixels of the second radiation detector 600b, to which no light is emitted from the scintillator 500 (to be referred to as non-irradiated pixel), is irradiated with light emitted from the scintillator 702. As a result, it is possible to suitably suppress deficiency in the radiographic image.

Further, the electronic cassette 700 according to the present modified example allows the scintillator 500 to be shifted with respect to the second radiation detector 600b by, for example, loosening the pressing force of the scintillator 500 against the second radiation detector 600b. Accordingly, it is possible to change the position of the scintillator 702 relative to the scintillator 500.

With this structure, even if defects develop at a part of the scintillator 500 and the corresponding part of the scintillator 702, and the scintillator 702 also fails to emit light to a non-irradiated pixel of the second radiation detector 600b, it is possible to reliably emit light to the non-irradiated pixel from the scintillator 702 by changing the position of the scintillator 702 relative to the scintillator 500 (by shifting the position of the non-irradiated pixel of the second radiation detector 600b). As a result, it is possible to suitably suppress deficiency in the radiographic image.

In the present modified example, the scintillator 500 is formed on the first radiation detector 600a by vapor deposition, while the scintillator 702 is formed on the second radiation detector 600b by vapor deposition. Therefore, by shifting the scintillator 500 with respect to the second radiation detector 600b, the positional relationship between pixels in the first radiation detector 600a and pixels in the second radiation detector 600b can be changed at the same time.

In the event where defective pixels are newly discovered in the defective pixel detection process in the first managing method, and it is determined by the first determiner 124a that a relationship exists in which the first regions 112a (defective pixels) are superposed on each other, the relative positioning of the first radiation detector 600a and the second radiation detector 600b can be shifted, such that the first regions 112a are no longer superposed on each other.

Further, for example, in the case it is determined by the second determiner 124b in the second managing method that the corrective unit regions 136 are even partially superposed one on the other, the relative positioning of the first radiation detector 600a and the second radiation detector 600b can be shifted, such that the corrective unit regions 136 are no longer superposed on each other.

Further, for example, in the case that it is determined by the third determiner 124c in the third managing method that a relationship exists in which one of the defective pixels is included in another defective pixel and peripheral pixels therearound, the relative positioning of the first radiation detector 600a and the second radiation detector 600b can be shifted, such that one of the defective pixels no longer is included in the other defective pixel and peripheral pixels therearound.

Although certain preferred embodiments of the present invention have been shown and described in detail, it should be understood that various changes and modifications may be made therein without departing from the scope of the appended claims.

What is claimed is:

1. A method of managing at least two radiation detectors of a radiographic image capturing apparatus, comprising the steps of:
   recognizing the positions of defective pixels of a plurality of manufactured radiation detectors;
   referring to the recognized positions of defective pixels and assembling at least two radiation detectors into the one radiographic image capturing apparatus in a superposed relationship, such that the defective pixels of the radiation detectors are not superposed one on the other in one pixel position;
   selecting two radiation detectors such that no defective pixels are superposed in a same pixel position by referring to the recognized positions of defective pixels;
   generating a plurality of region information tables corresponding to the respective manufactured radiation detectors, each of the region information tables registering therein positional information of first regions, which include defective pixels, and second regions, which are free of defective pixels,
      wherein the first regions and the second regions have the same pixel array, and
      wherein the step of selecting two radiation detectors comprises the step of selecting two radiation detectors from the manufactured radiation detectors, such that the first regions and the second regions are superposed one on the other when the two radiation detectors are stacked together, based on the region information tables;
   reflecting the position of a defective pixel, which is newly discovered in a regular or irregular defective pixel detecting process carried out on the radiographic image capturing apparatus, which incorporates the two radiation detectors stacked together, in the region information tables corresponding to the two radiation detectors;
   determining whether or not the first regions are superposed one on the other based on the region information tables corresponding to the two radiation detectors stacked together; and
   issuing a warning if it is judged in the determining step that the first regions are superposed one on the other.

2. A method of managing at least two radiation detectors of a radiographic image capturing apparatus, comprising the steps of:
   recognizing the positions of defective pixels of a plurality of manufactured radiation detectors;
   referring to the recognized positions of defective pixels and assembling at least two radiation detectors into the one radiographic image capturing apparatus in a superposed relationship, such that the defective pixels of the radiation detectors are not superposed one on the other;
   selecting two radiation detectors from the manufactured radiation detectors to be assembled into the one radiographic image capturing apparatus;
   generating a plurality of corrective region information tables corresponding to the respective manufactured radiation detectors and each registering therein positional information of a corrective unit region,
      wherein the corrective unit region represents a region including a defective pixel and peripheral pixels used in correcting data of the defective pixel, and
      wherein the step of selecting two radiation detectors comprises the step of selecting two radiation detectors from the manufactured radiation detectors, such that corrective unit regions thereof are not even partially superposed one on the other when two radiation detectors are stacked together, based on the corrective region information tables;
   reflecting the position of a defective pixel, which is newly discovered in a regular or irregular defective pixel detecting process carried out on the radiographic image capturing apparatus, which incorporates the two radiation detectors stacked together, in the corrective region information tables corresponding to the two radiation detectors;
   determining whether or not the corrective unit regions are even partially superposed one on the other based on the corrective region information tables corresponding to the two radiation detectors stacked together; and
   issuing a warning if it is judged in the step of determining that the corrective unit regions are even partially superposed one on the other.

3. A method of managing at least two radiation detectors of a radiographic image capturing apparatus, comprising the steps of:
   recognizing the positions of defective pixels of a plurality of manufactured radiation detectors;
   referring to the recognized positions of defective pixels and assembling at least two radiation detectors into the one radiographic image capturing apparatus in a superposed relationship, such that the defective pixels of the radiation detectors are not superposed one on the other;
   selecting two radiation detectors from the manufactured radiation detectors to be assembled into the one radiographic image capturing apparatus; and
   when the two radiation detectors are displaced less than one-pixel pitch along at least one direction and assembled into the radiographic image capturing apparatus, generating a plurality of peripheral pixel information tables corresponding to the respective manufactured radiation detectors and each registering therein positional information of a defective pixel and peripheral pixels disposed therearound and adjacent thereto along a row and a column, wherein the step of selecting two radiation detectors comprises the step of selecting two radiation detectors from among the manufactured radiation detectors, such that a defective pixel of one of the two radiation detectors is not included in a defective pixel and peripheral pixels therearound of the other of the two radiation detectors, and also such that a defective pixel of the other of the two radiation detectors is not included in a defective pixel and peripheral pixels therearound of the one of the two radiation detectors, when the two radiation detectors are stacked together, based on the peripheral pixel information tables.

4. The method according to claim 3, further comprising the steps of:

reflecting the position of a defective pixel, which is newly discovered in a regular or irregular defective pixel detecting process carried out on the radiographic image capturing apparatus, which incorporates the two radiation detectors stacked together, in the peripheral pixel information tables corresponding to the two radiation detectors;

determining whether or not a defective pixel of the one of the two radiation detectors is included in a defective pixel and peripheral pixels therearound of the other of the two radiation detectors based on the peripheral pixel information tables corresponding to the two radiation detectors stacked together; and issuing a warning if it is judged in the step of determining that a defective pixel of the one of the two radiation detectors is included in a defective pixel and peripheral pixels therearound of the other of the two radiation detectors.

5. A radiographic image capturing apparatus comprising:

two radiation detectors designated respectively as a first radiation detector and a second radiation detector, for detecting and converting radiation that has passed through a subject into radiographic image information, wherein the first radiation detector and the second radiation detector are assembled in place such that defective pixels thereof are not superposed one on the other in the same pixel position; and wherein the first radiation detector and the second radiation detector have characteristics different from each other.

6. The radiographic image capturing apparatus according to claim 5, wherein the characteristic is resolution.

7. A radiographic image capturing apparatus comprising:

at least two radiation detectors for detecting and converting radiation that has passed through a subject into radiographic image information;

wherein the at least two radiation detectors are assembled in place such that defective pixels thereof are not superposed one on the other in the same pixel position, and wherein a scintillator is interposed between the at least two radiation detectors, and at least one of the at least two radiation detectors is not fixed to the scintillator.

8. A radiographic image capturing system including a radiographic image capturing apparatus, which incorporates therein two radiation detectors for detecting and converting radiation that has passed through a subject into radiographic image information, comprising:

a plurality of region information tables generated corresponding to the respective two radiation detectors and each registering therein positional information of first regions including defective pixels and second regions free of defective pixels;

a first table updater for reflecting the position of a defective pixel, which is newly discovered in a regular or irregular defective pixel detecting process carried out on the radiographic image capturing apparatus, in the region information tables;

a first determiner for determining whether or not the first regions are superposed one on the other based on the region information tables, which have reflected therein the position of the newly discovered defective pixel; and a first warning output section for issuing a warning if the first determiner judges that the first regions are superposed one on the other.

9. The radiographic image capturing system according to claim 8, wherein two of the radiation detectors are provided, designated respectively as a first radiation detector and a second radiation detector, the radiographic image capturing apparatus further comprising:

a scintillator disposed between the first radiation detector and the second radiation detector and which converts the radiation into visible light;

the first radiation detector, which is positioned closer to a side of the subject than the scintillator, including a photoelectric conversion device for absorbing the visible light and generating electric charges corresponding to the visible light, and a signal output unit for converting the charges into electric signals and outputting the electric signals;

the photoelectric conversion device including an organic photoconductor; and the signal output unit including an organic semiconductor material.

* * * * *